US012739375B2

(12) United States Patent
Krivokuca et al.

(10) Patent No.: US 12,739,375 B2
(45) Date of Patent: Sep. 15, 2026

(54) PROGRESSIVE ENCODING AND ADAPTIVE RECONSTRUCTION OF DYNAMIC MESHES USING ZEROTREE CODING

(71) Applicant: InterDigital CE Patent Holdings, SAS, Paris (FR)

(72) Inventors: Maja Krivokuca, Cesson-Sevigne (FR); Tomás Borges, Brasilia (BR); Olivier Mocquard, Cesson-Sevigne (FR); Jean-Eudes Marvie, Plerin (FR); Olivier Roupin, Rennes (FR); Julien Ricard, Plouër-sur-Rance (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 19/111,477

(22) PCT Filed: Sep. 10, 2023

(86) PCT No.: PCT/EP2023/074819
§ 371 (c)(1),
(2) Date: Mar. 13, 2025

(87) PCT Pub. No.: WO2024/061661
PCT Pub. Date: Mar. 28, 2024

(65) Prior Publication Data

US 2026/0113444 A1 Apr. 23, 2026

(30) Foreign Application Priority Data

Sep. 19, 2022 (EP) .................................... 22306374
Apr. 18, 2023 (EP) .................................... 23305598

(51) Int. Cl.
*H04N 19/119* (2014.01)
*H04N 19/14* (2014.01)
(Continued)

(52) U.S. Cl.
CPC ........... *H04N 19/119* (2014.11); *H04N 19/14* (2014.11); *H04N 19/18* (2014.11); *H04N 19/647* (2014.11)

(58) Field of Classification Search
CPC ...... H04N 19/119; H04N 19/14; H04N 19/18; H04N 19/647
See application file for complete search history.

(56) References Cited

U.S. PATENT DOCUMENTS 10,192,353 B1 * 1/2019 Chou ...................... G06T 17/00
2008/0193027 A1 * 8/2008 Gioia ...................... G06T 9/001 382/240

(Continued)

OTHER PUBLICATIONS

Sweldens, “The Lifting Scheme: A Construction of Second Generation Wavelets,” Siam J. Math. Anal, vol. 29, Nr. 2, 42 pages, 1997.

(Continued)

*Primary Examiner* — Richard T Torrente
(74) *Attorney, Agent, or Firm* — Smadar Gefen

(57) ABSTRACT

Apparatuses and methods are disclosed for progressively encoding a mesh. Techniques disclosed include obtaining displacement data representative of a spatial difference between a base mesh and the mesh to be encoded, transforming the displacement data into wavelet coefficients, computed at multiple resolution levels, and then zerotree encoding the wavelet coefficients in a traversal order according to a zerotree hierarchy, generating a zerotree bitstream of coded displacement data. Further apparatuses and methods are disclosed for progressively decoding the mesh. Techniques disclosed include obtaining the zerotree bitstream that codes the displacement data, zerotree decoding the wavelet coefficients from the bitstream, and inverse transforming the decoded wavelet coefficients into decoded displacement data.

25 Claims, 10 Drawing Sheets

(51) Int. Cl.
*H04N 19/18* (2014.01)
*H04N 19/64* (2014.01)

(56) References Cited

U.S. PATENT DOCUMENTS

| | | | | |
|---|---|---|---|---|
| 2008/0240251 | A1* | 10/2008 | Gioia | G06T 9/001 375/240.19 |
| 2018/0075622 | A1* | 3/2018 | Tuffreau | G06T 9/001 |
| 2023/0412849 | A1* | 12/2023 | Huang | H04N 19/91 |
| 2025/0148646 | A1* | 5/2025 | Nishimura | H04N 19/52 |
| 2025/0200814 | A1* | 6/2025 | Kim | H04N 19/20 |
| 2025/0386050 | A1* | 12/2025 | Ilola | H04N 19/597 |

OTHER PUBLICATIONS

Dodgson et al., "Characteristics of dual√3 subdivision schemes," in Fifth International Conference on Curves & Surfaces, St Malo, France, 2002, 2 pages.

Shapiro, "Embedded Image Coding Using Zerotrees of Wavelet Coefficients", IEEE Transactions On Signal Processing IEEE, vol. 41, No. 12, pp. 3445-3462, Dec. 1, 1993.

Benton, "Advanced Graphics - Subdivision Surfaces," University of Cambridge, 37 pp. 2002-2017.

Sweldens, "The Lifting Scheme: A Construction of Second Generation Wavelets," Siam J. Math. Anal, vol. 29, Nr. 2, 42 p. 1997.

"CfP for Dynamic Mesh Coding", ISO/IEC JTC 1/SC 29/WG 7, N231, Mpeg 3D Graphics Coding Convenorship: AFNOR (France), Oct. 29, 2021, 38 pages.

Krivokuca et al., "[V-DMC] [EE4.7-related] Zerotree Coding Syntax for m63183", ISO/IEC JTC 1/SC 29/WG 7 m63186, pp. 1-6, Apr. 2023.

Mammou et al., "[V-CG] Apple's Dynamic Mesh Coding CfP Response", Apple Inc., ISO/IEC JTC 1/SC 29/WG 7 m59281, 21 pages, Apr. 2022.

Dodgson et al., "Characteristics of dualv 3 subdivision schemes," in Fifth International Conference on Curves & Surfaces, St Malo, France, 2002, 2 pages.

Khodakovsky et al., "Progressive Geometry Compression," SIGGRAPH'00, New Orleans, Louisiana, USA, 2000, 8 pages.

Krivokuca et al., "[V-DMC] [EE4.7-related] Hierarchical Zerotree Coding of Subdivision Wavelet Coefficients", ISO/IEC JTC 1/SC 29/WG 7 m63183, pp. 1-13, Apr. 2023.

Kolarov et al., "Wavelet Compression for 3D and Higher-Dimensional Objects" Spie Conference on Applications of Digital Image Procession, vol. 3164, San Diego, 1997, 13 pages.

Garland et al., "Surface Simplification using Quadric Error," in SIGGRAPH'97, Carnegie Mellon University, Los Angeles, California, USA, 1997, 8 pages.

* cited by examiner

100

200

300

400

600

500

700

900

800

1000

1100

1200

1300

PROGRESSIVE ENCODING AND ADAPTIVE RECONSTRUCTION OF DYNAMIC MESHES USING ZEROTREE CODING

CROSS REFERENCE TO RELATED APPLICATIONS

This application is a U.S. National Stage Application under 35 U.S.C. 371 of International Patent Application No. PCT/EP2023/074819 filed Sep. 10, 2023, which claims the benefit of European Patent Application Nos. 23305598.7 filed Apr. 18, 2023, and 22306374.4, filed Sep. 19, 2022, which are all incorporated herein by reference in their entirety.

BACKGROUND

Dynamic meshes are commonly used to represent computer generated or camera captured objects. Due to the large amount of data involved in dynamic meshes' representations, efficient compression techniques are required to deliver them to consumers. Since systems and applications that generate or consume bitstreams of coded mesh data vary in their processing bitrate limits and quality requirements, scalability (in resolution or quality) of the coded mesh data is an important feature. Additionally, based on an application's requirements and/or the mesh itself, reconstructing the mesh at locally varying detail is an important capability. Therefore, techniques are needed for progressive encoding and adaptive reconstruction of dynamic meshes.

SUMMARY

The present disclosure describes apparatuses and methods for progressively encoding a dynamic mesh, applying a zerotree coding to subdivision wavelets that represent mesh data. The produced zerotree codes can then be used to drive an adaptive refinement of the reconstructed mesh.

Aspects disclosed in the present disclosure describe methods for progressively encoding a mesh. The methods include obtaining displacement data representative of a spatial difference between a base mesh and the mesh, transforming the displacement data into wavelet coefficients that are computed at multiple resolution levels associated with respective mesh subdivisions representative of the mesh, and zerotree encoding the wavelet coefficients in a traversal order according to a zerotree hierarchy to generate a zerotree bitstream of coded displacement data. Further aspects disclosed in the present disclosure describe methods for progressively decoding the mesh. The methods include obtaining the zerotree bitstream, zerotree decoding the wavelet coefficients from the bitstream in a traversal order according to the zerotree hierarchy, and inverse transforming the decoded wavelet coefficients into decoded displacement data.

Aspects disclosed in the present disclosure describe an apparatus for progressively encoding a mesh. The apparatus comprises at least one processor and memory storing instructions. The instructions, when executed by the at least one processor, cause the apparatus to obtain displacement data representative of a spatial difference between a base mesh and the mesh, to transform the displacement data into wavelet coefficients that are computed at multiple resolution levels associated with respective mesh subdivisions representative of the mesh, and to zerotree encode the wavelet coefficients in a traversal order according to a zerotree hierarchy, generating a zerotree bitstream of coded displacement data. Further aspects disclosed in the present disclosure describe an apparatus for progressively decoding the mesh. The apparatus comprises at least one processor and memory storing instructions. The instructions, when executed by the at least one processor, cause the apparatus to obtain the zerotree bitstream, to zerotree decode the wavelet coefficients from the bitstream in a traversal order according to the zerotree hierarchy, and to inverse transform the decoded wavelet coefficients into decoded displacement data.

Aspects disclosed in the present disclosure describe a non-transitory computer-readable medium comprising instructions executable by at least one processor to perform methods for progressively encoding a mesh. The methods include obtaining displacement data representative of a spatial difference between a base mesh and the mesh, transforming the displacement data into wavelet coefficients that are computed at multiple resolution levels associated with respective mesh subdivisions representative of the mesh, and zerotree encoding the wavelet coefficients in a traversal order according to a zerotree hierarchy to generate a zerotree bitstream of coded displacement data. Further aspects disclosed in the present disclosure describe a non-transitory computer-readable medium comprising instructions executable by at least one processor to perform methods for progressively decoding the mesh. The methods include obtaining the zerotree bitstream, zerotree decoding the wavelet coefficients from the bitstream in a traversal order according to the zerotree hierarchy, and inverse transforming the decoded wavelet coefficients into decoded displacement data.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION

Figure 1:
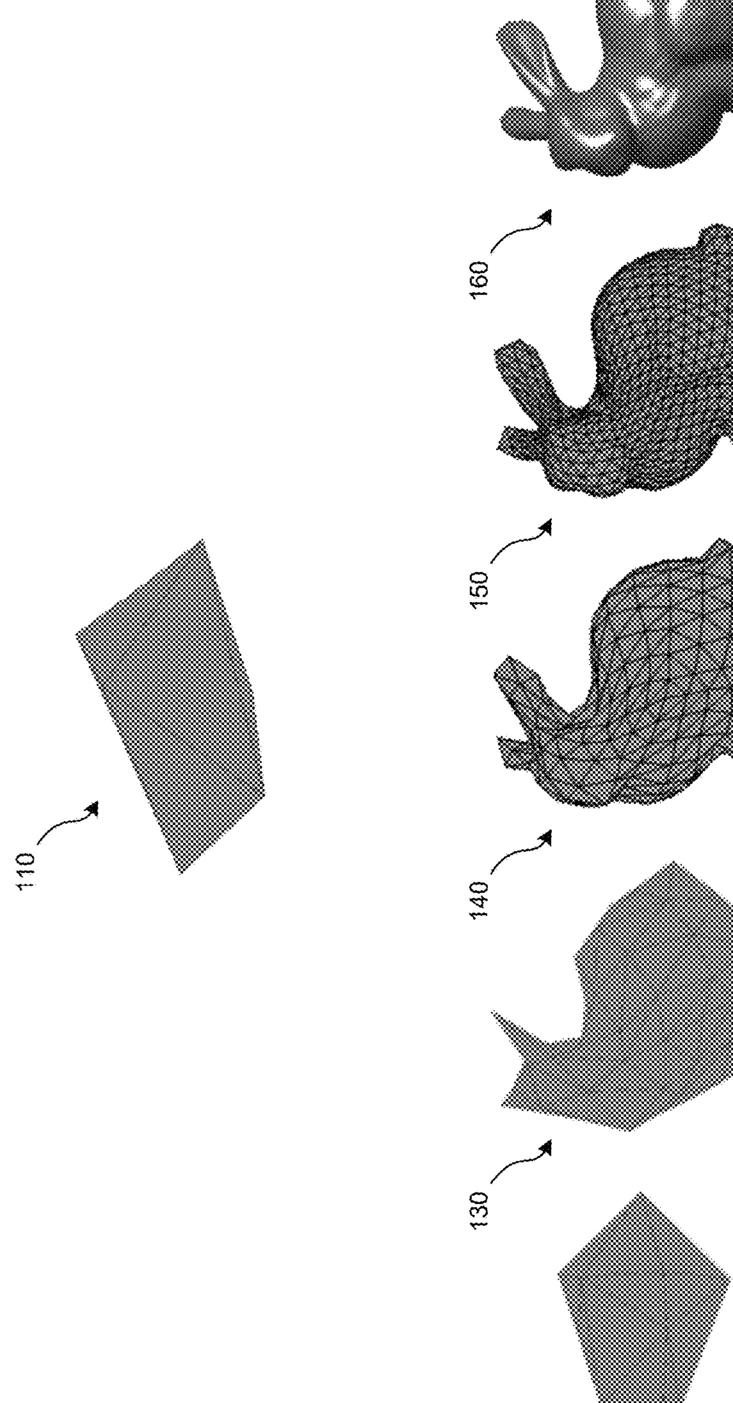
FIG. 1 illustrates surface refinement using an iterative subdivision process, according to aspects of the present disclosure.
Figure 1:

Apparatuses and methods, disclosed herein, employ a zerotree coder, using a subdivision wavelet framework to zerotree code mesh data. The mesh zerotree coder organizes and encodes wavelet coefficients that represent a spatial displacement between an original mesh to be encoded and its respective base mesh. The zerotree codes produced by the mesh zerotree coder can drive an adaptive refinement of the decoded mesh at the decoder, not requiring the transmission of information to indicate the location on the mesh to be refined. In addition to zerotree coding of mesh data, zerotree bitstream syntax is presented herein.

The application of zerotree coding to wavelet coefficients, as disclosed herein, takes advantage of the natural hierarchical organization of the subdivision wavelet coefficients. Coding the wavelet coefficients based on their importance allows for a coding gain (as the importance of a child wavelet coefficient can be predicted based on the importance of its parent wavelet coefficient). Moreover, applying zerotree coding to wavelet coefficients according to aspects described herein readily lends itself to resolution scalability and quality scalability of the reconstructed mesh and provides the decoder with the option of truncating the incoming bitstream (or stopping the decoding operation) when the decoder is satisfied with the quality of the reconstructed mesh and/or when a bitrate limit has been reached. Consequently, the mesh can be compressed into a bitstream only once, and the amount of data required to reconstruct the mesh at a certain bitrate (or at a certain quality level) can be extracted from that bitstream by the decoder. Additionally, the zerotree codes can be used to drive an adaptive mesh subdivision at the decoder. Hence, the decoder can produce a mesh with a number of mesh triangles that can be adapted to the importance of wavelet coefficients in different areas of the mesh, thereby avoiding unnecessary processing associated with an excessive number of mesh triangles (that would be produced if a uniform subdivision is applied).

Following the MPEG V-Mesh CfP, the solution described by Mammou et al. was selected as the MPEG V-Mesh Test Model, to serve as the basis for future development of this standard. See, K. Mammou, J. Kim, A. Tourapis and D. Podborski, m59281-[V-CG] Apple's Dynamic Mesh Coding CfP Response, Apple Inc, 2022 ("Mammou"). The MPEG V-Mesh Test Model (referred to herein as the test model) is generally described herein in reference to FIGS. 1-7. Aspects of the present disclosure provide improvements to the test model, as described herein in reference to FIGS. 8-13.

In the test model, the coding of a mesh geometry (that is, the position vectors of the mesh vertices) is conceptually based on a subdivision wavelet scheme, as described in M. Lounsbery, PhD Thesis-Multiresolution Analysis for Surfaces of Arbitrary Topological Type, Department of Computer Science and Engineering, University of Washington, Seattle, Washington, USA, 1994, and in M. Lounsbery et al., "Multiresolution Analysis for Surfaces of Arbitrary Topological Type," ACM Transactions on Graphics, vol. 16, no. 1, pp. 34-73, 1997 (collectively referred to herein as "Lounsbery"). In the test model, the implementation of the coding of the mesh geometry is done using a lifting wavelet transform (i.e., a lifting transform) that does not require the computations or estimations of inner products between the mesh's position vectors and the vectors of the wavelet basis. See, W. Sweldens, "The Lifting Scheme: A Construction of Second Generation Wavelets," SIAM Journal on Mathematical Analysis, vol. 29, no. 2, pp. 511-546, 1998 ("Sweldens").

The subdivision wavelet scheme (used in the coding of a mesh geometry) is based on surface subdivision, a process that is well known in the field of computer graphics. Surface subdivision begins with a simple 3D mesh, so-called a base mesh, which can be obtained by a process of mesh simplification (or mesh decimation) from a higher-resolution mesh (i.e., the input mesh to be encoded) to a lower-resolution mesh (i.e., the base mesh). The base mesh contains a relatively small number of vertices and faces (e.g., planar triangles or other planar convex shapes such as quadrilaterals). This base mesh is then refined in a predictable manner by using a subdivision process that iteratively adds new vertices and faces to the mesh by subdividing the existing faces into smaller sub-faces. In each iteration, the newly added vertices can be displaced to new positions according to some pre-defined rules to gradually refine the mesh shape so as to obtain a smoother (and/or a more complex) surface that increasingly matches the input mesh, as demonstrated in FIG. 1.

FIG. 1 illustrates surface refinement using an iterative subdivision process 100. In the example of FIG. 1, an original octahedron model 110, that is, a base mesh, is to be refined. Increasingly refined meshes (i.e., mesh subdivisions) 120-160 are produced, each mesh subdivision is a result of one or more subdivision iterations. The most refined mesh 160 is shown in FIG. 1 after applying a rendering operation (using, for example, an interpolated shading rendering method) to demonstrate its smoothness. Different surface subdivision schemes exist in the literature and in practice. See, for example, A. Benton, "Advanced Graphics-Subdivision Surfaces," University of Cambridge. In the test model, a simple mid-point subdivision scheme is described (that is, inserting a new vertex at the midpoint of each existing edge, at each iteration), as further described below.

In Lounsbery, the theory of multiresolution analysis is extended to 3D mesh surfaces, utilizing the concept of subdivision surfaces to define wavelet-like constructions, so-called, subdivision wavelets. The simplest form of subdivision wavelets (which has linear time complexity for analysis and synthesis) can be implemented by a piecewise linear subdivision that is basically equivalent to the lifting transform, as described in Sweldens. In this simple form, the lowest-resolution approximation of the mesh shape is represented by the base mesh, and successive resolution levels are represented by wavelet coefficients. Thus, a wavelet coefficient between any two successive resolution levels represents the difference between: 1) actual child's vertex position at the higher resolution level and 2) a respective prediction of this child's vertex position that is derived from the vertex positions of associated parents at a lower resolution level. The computation of these wavelet coefficients is described further in reference to FIG. 2.

Figure 2:
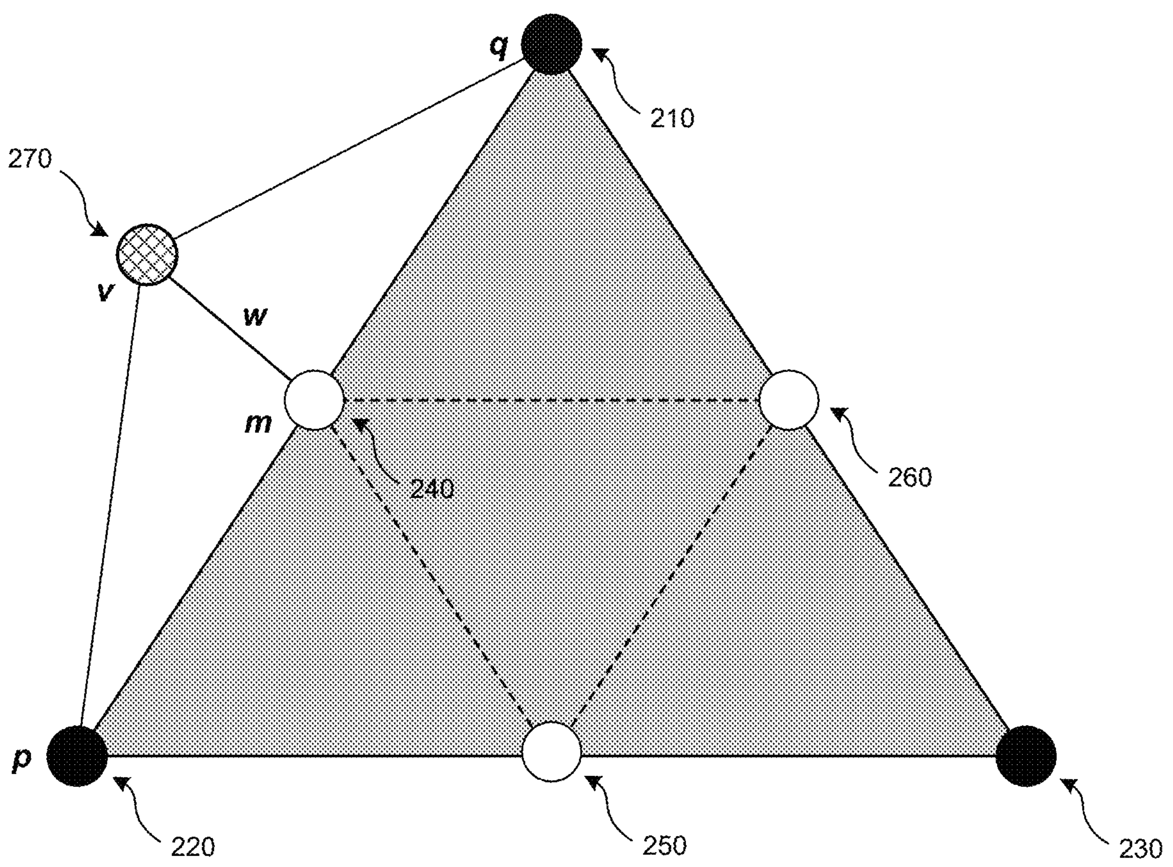
FIG. 2 illustrates a subdivision wavelet framework, according to aspects of the present disclosure.

FIG. 2 illustrates a subdivision wavelet framework 200, where wavelet coefficients are computed in a linear polyhedral subdivision. In the example of FIG. 2, vertices 210, 220, and 230 (full circles) represent the vertices of a face (shaded triangle) in the base mesh and vertices 240, 250, and 260 (hollow circles) represent new vertices inserted at the midpoints of the respective edges of the face. As illustrated, the new vertex 240, denoted m, is inserted between two base mesh vertices 210 and 220, denoted respectively as q and p. The new vertex m is a prediction of a corresponding vertex 270, denoted v, where vertex v is located at a target position, for example, a position on (or closer to) the mesh surface to be approximated by this vertex in a higher-resolution level. The corresponding wavelet coefficient w represents the distance between m and v, as follows:

$$w=v-\tfrac{1}{2}(p+q)=v-m \quad (1)$$

Thus, the base mesh can be iteratively refined by additional subdivisions, successively adding more and more wavelet coefficients at higher resolution levels.

Note that because, in a subdivision wavelet framework, the refinement of the base mesh can be done in a predictable manner by using a set of standard subdivision rules known to both the encoder and the decoder, the only information that needs to be transmitted to the decoder is that associated with the connectivity and the geometry of the base mesh itself (which is typically very small) and a set of encoded wavelet coefficients. However, in this approach the input mesh (the original mesh to be encoded) is expected to have a semi-regular (or subdivision) connectivity, so that the connectivity of the input mesh can be achieved by repeatedly subdividing each face of a coarse base mesh into, for example, four sub-faces until the resolution of the original input mesh is obtained. In practice, meshes are re-meshed to obtain a version of the input mesh with semi-regular connectivity, meaning that the original mesh connectivity is not preserved.

In the test model, since the test meshes used by the MPEG-3DGC group do not have semi-regular connectivity, each original mesh is first down-sampled to obtain a coarse base mesh by using, for example, the method described in Garland et al., "Surface Simplification using Quadric Error Metrics," in SIGGRAPH'97, Los Angeles, California, USA, 1997. And then, a mid-point subdivision scheme is applied to the base mesh to iteratively up-sample the base mesh to reach approximately the same resolution (that is, the same number of vertices and faces) as in the original mesh. Note that the original mesh connectivity is therefore not preserved. The spatial difference, expressed by displacement vectors, between the upsampled mesh's vertex positions at the highest subdivision (resolution) level and the corresponding original mesh vertex positions is then compensated for by deforming the upsampled mesh surface to spatially approximate the original mesh surface. To that end, corresponding vertex positions from the upsampled mesh and the original mesh can be found by nearest-point searching, for example. In the test model, displacement data (including displacement vectors) are transformed into wavelet coefficients using a linear lifting transform, though any other kind of wavelet transform can be used as indicated therein.

The test model's systems for dynamic mesh encoding and decoding, including the representation of displacement data, are further described below in reference to FIGS. 3-6 (focusing on the test model's intra-frame encoder and decoder architectures).

Figure 3:
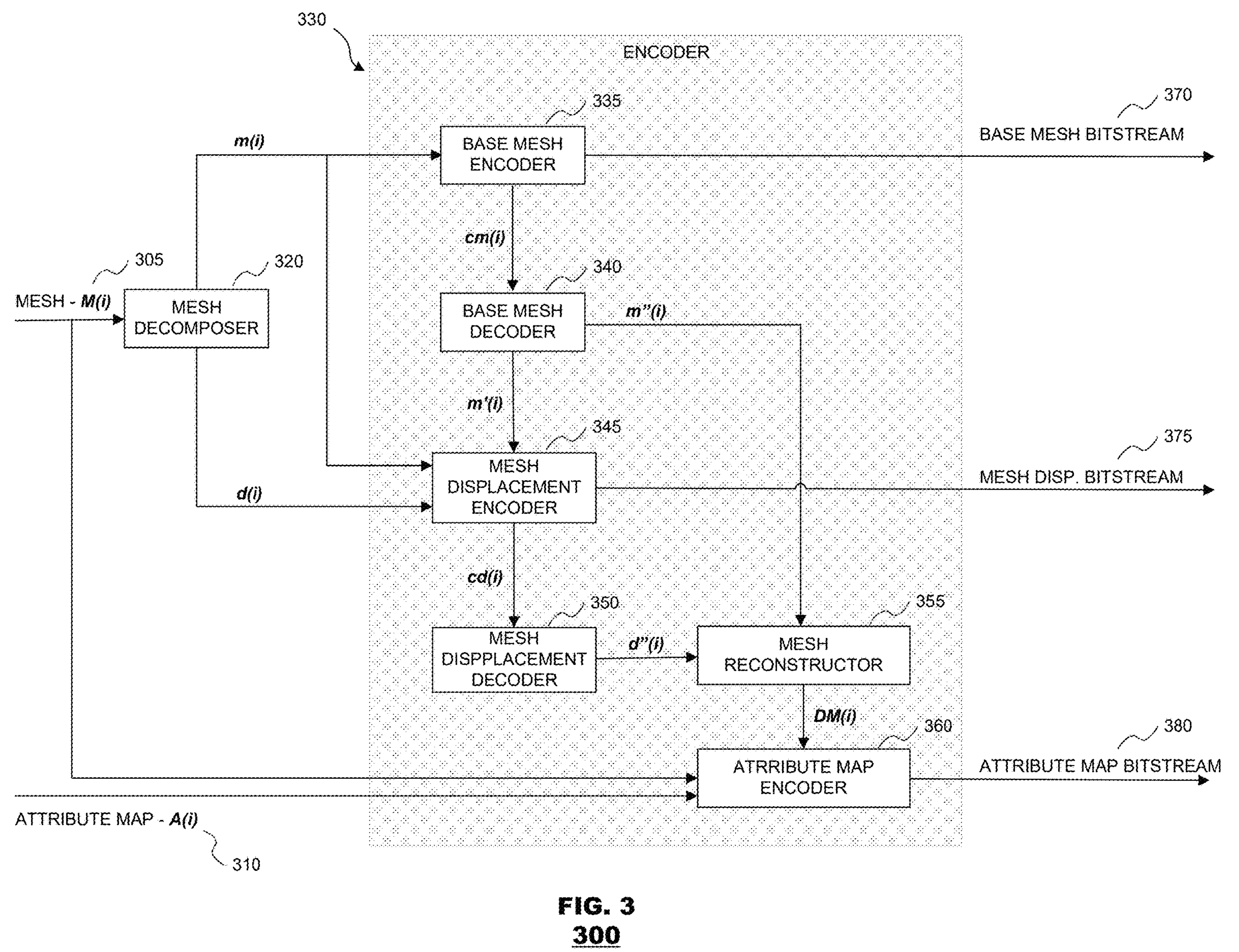
FIG. 3 is a functional block diagram of an example system for dynamic mesh encoding, according to aspects of the present disclosure.

FIG. 3 is a functional block diagram of an example system 300 for dynamic mesh encoding. The system 300 illustrates the encoding of a frame sequence F(i), where data associated with frame i include a mesh M(i) 305 and corresponding attribute map(s) A(i) 310. The system 300 includes a mesh decomposer 320 (e.g., a part of a pre-processing unit) and an encoder 330. The mesh decomposer 320 is configured to decompose an input mesh M(i) 305 into a base mesh m(i) and corresponding displacement vectors d(i). The generated base mesh m(i) and displacement vectors d(i), together with the corresponding attribute map(s) A(i) 310, are then fed into the encoder 330. The encoder 330 encodes the obtained data—m(i), d(i), and A(i)—generating therefrom respective bitstreams, including a base mesh bitstream 370, a mesh displacement bitstream 375, and an attribute map bitstream 380. The operation of the mesh decomposer 320 and the operation of the encoder 330 are further described below.

The decomposer 320 is configured to decompose a mesh M(i) 305 into a base mesh m(i) and corresponding displacement vectors d(i). To generate a base mesh m(i), the decomposer 320 decimates the mesh M(i) by sub-sampling the mesh's vertices. A subdivided mesh is then generated by subdividing the base mesh m(i), that is, each surface (face) of the base mesh is subdivided into multiple sub-surfaces, introducing additional new vertices. Any subdivision scheme may be applied, optionally, iteratively. For example, each triangle of the base mesh surface can be split into four sub-triangles by introducing three new vertices in the middle of the triangle's edges and by connecting those three vertices (as illustrated in FIG. 2). Next, the decomposer 320 determines displacement vectors d(i) for respective vertices of the subdivided base mesh, so that, when applied to those vertices, a deformed mesh is generated that spatially fits the input mesh M(i) 305. Decomposing the received mesh M(i) in this manner—to allow encoding of the base mesh m(i) and its corresponding displacement vectors d(i) instead of encoding directly the mesh M(i) 305—improves compression efficiency. This is because the base mesh has fewer vertices relative to the mesh M(i) 305, and, therefore, can be encoded by a relatively smaller number of bits. Furthermore, the displacement vectors can be efficiently encoded using, for example, a wavelet transform, enabled by the subdivision structure as described herein. The used subdivision structure need not be explicitly encoded as it can be determined by the decoder. For example, the decoder can subdivide the decoded base mesh based on a subdivision scheme type and a subdivision iteration count that can be signaled in the bitstream.

As illustrated in FIG. 3, the encoder 330 includes a base mesh encoder 335, a base mesh decoder 340, a mesh displacement encoder 345, a mesh displacement decoder 350, a mesh reconstructor 355, and an attribute map encoder 360. The base mesh encoder 335 (including a quantizer and a static mesh encoder) is configured to encode the base mesh m(i) into coded base mesh cm(i) and to generate therefrom the base mesh bitstream 370. The base mesh decoder 340 is configured to reconstruct (decode) the base mesh from the coded base mesh cm(i), resulting in a reconstructed quantized base mesh m'(i) and a reconstructed base mesh m"(i). The mesh displacement encoder 345 receives as input the base mesh m(i) and the reconstructed quantized base mesh m'(i), based on which it can update the received displacement vectors d(i). The mesh displacement encoder 345 is configured to encode the (updated) displacement vectors d(i) into coded displacement vectors cd(i) and to generate therefrom the mesh displacement bitstream 375. The mesh displacement decoder 350 is configured to reconstruct (decode)

the displacement vectors from the coded displacement vectors cd(i), resulting in reconstructed displacement vectors d"(i). Based on the reconstructed base mesh m"(i) and the reconstructed displacement vectors d"(i), the mesh reconstructor 355 is configured to reconstruct (decode) the mesh into reconstructed mesh DM(i). Then, based on the mesh M(i) and the reconstructed mesh DM(i), the attribute map encoder 360 is configured to encode the attribute map(s) A(i) into coded attribute map(s) and to generate therefrom the attribute map bitstream 380.

Figure 4:
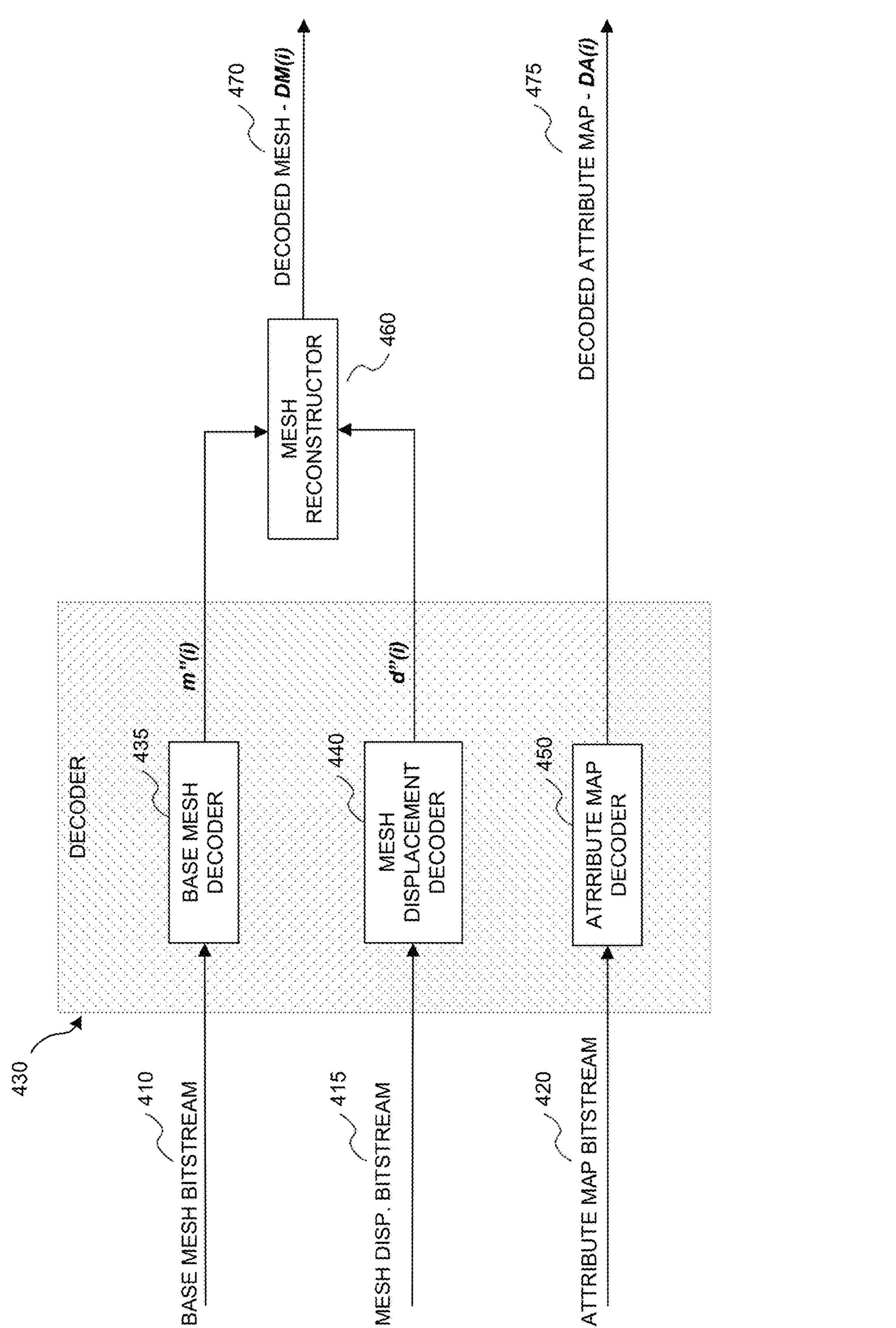
FIG. 4 is a functional block diagram of an example system for dynamic mesh decoding, according to aspects of the present disclosure.

FIG. 4 is a functional block diagram of an example system 400 for dynamic mesh decoding. The system 400 is configured to generally reverse the operation of system 300, including a decoder 430 and a mesh reconstructor 460. The decoder 430 includes a base mesh decoder 435 (including a static mesh decoder and an inverse quantizer), a mesh displacement decoder 440, and an attribute map decoder 450. The base mesh decoder 435 decodes the reconstructed base mesh m"(i) out of the base mesh bitstream 410, 370. The mesh displacement decoder 440 decodes the reconstructed displacement vectors d"(i) out of the mesh displacement bitstream 415, 375. The attribute map decoder 450 decodes the attribute map out of the attribute map bitstream 420, 380, reversing the operation of the attribute map encoder 360 to generate the reconstructed attribute map DA(i) 475. The decoder's 430 outputs of the reconstructed base mesh m"(i) and the reconstructed displacement vectors d"(i) are then used by the mesh reconstructor 460 to reconstruct the decoded mesh DM(i) 470.

Figure 5:
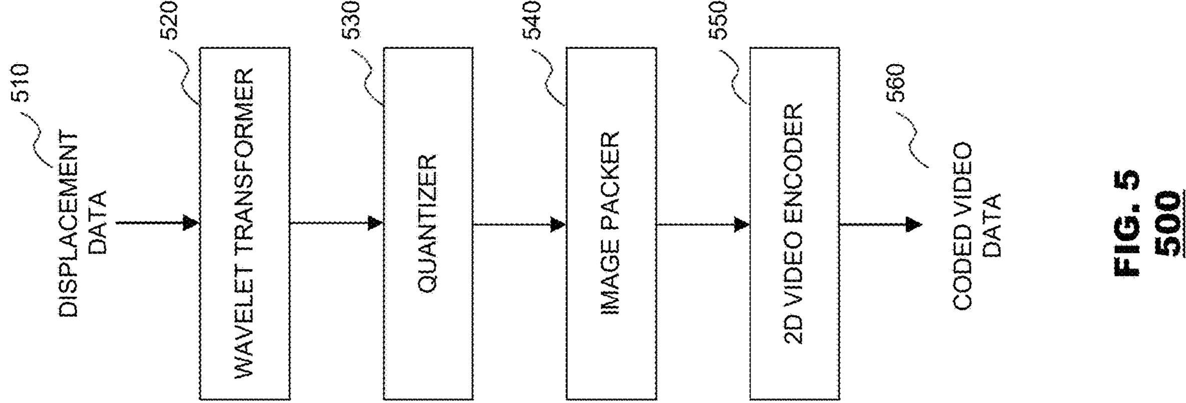
FIG. 5 is a functional block diagram of an example mesh displacement encoder, according to aspects of the present disclosure.

FIG. 5 is a functional block diagram of an example mesh displacement encoder 500 (e.g., the mesh displacement encoder 345 of FIG. 3). The mesh displacement encoder 500 encodes displacement data 510, representative of the spatial difference between the base mesh m(i) and the original mesh M(i) for a frame i—that is, the displacement vectors d(i) of FIG. 3. In the mesh displacement encoder 500, the displacement data 510 are transformed by a wavelet transformer 520. The resulting wavelet coefficients are then quantized, by a quantizer 530 using, for example, a uniform scalar quantizer with a dead-zone (that is, a symmetric area around zero, typically, with a larger width than the other quantization steps, so that more of the small input values will be quantized to zero). Next, the quantized wavelet coefficients are packed, by an image packer 540, into a 2D image. The 2D image is then encoded by a 2D video encoder 550, generating coded video data 560. Note that the 2D video encoder 550 may implement any video encoding method (either lossless or lossy) in accordance with a specific application's requirements.

Figure 6:
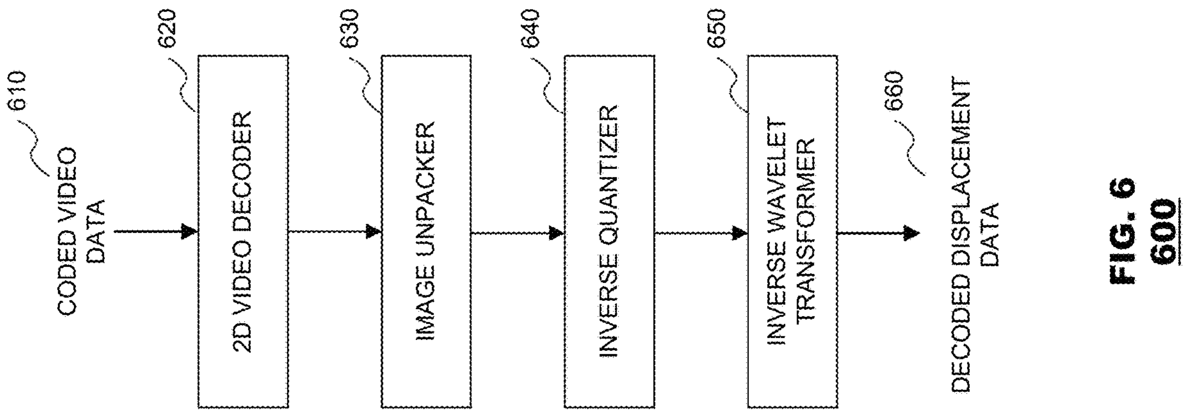
FIG. 6 is a functional block diagram of an example mesh displacement decoder, according to aspects of the present disclosure.

FIG. 6 is a functional block diagram of an example mesh displacement decoder 600 (e.g., the mesh displacement decoder 440, 350 shown in FIG. 3 and FIG. 4). The mesh displacement decoder 600 generally reverses the operation of the mesh displacement encoder 500. Accordingly, the mesh displacement decoder 600 employs a 2D video decoder 620 to decode the packed 2D image from the coded video data 610 generated by the 2D video encoder 550. Next, an image unpacker 630 is employed to unpack the decoded 2D image to obtain the quantized wavelet coefficients. An inverse quantizer 640 dequantizes the quantized wavelet coefficients. The dequantized wavelet coefficients are then inverse transformed by an inverse wavelet transformer 650, generating decoded displacement data 660—for example, the reconstructed displacement vectors d"(i) shown in FIG. 3 and FIG. 4. Sweldens' forward lifting transform, used by the wavelet transformer 520, is described next in reference to FIG. 7.

Figure 7:
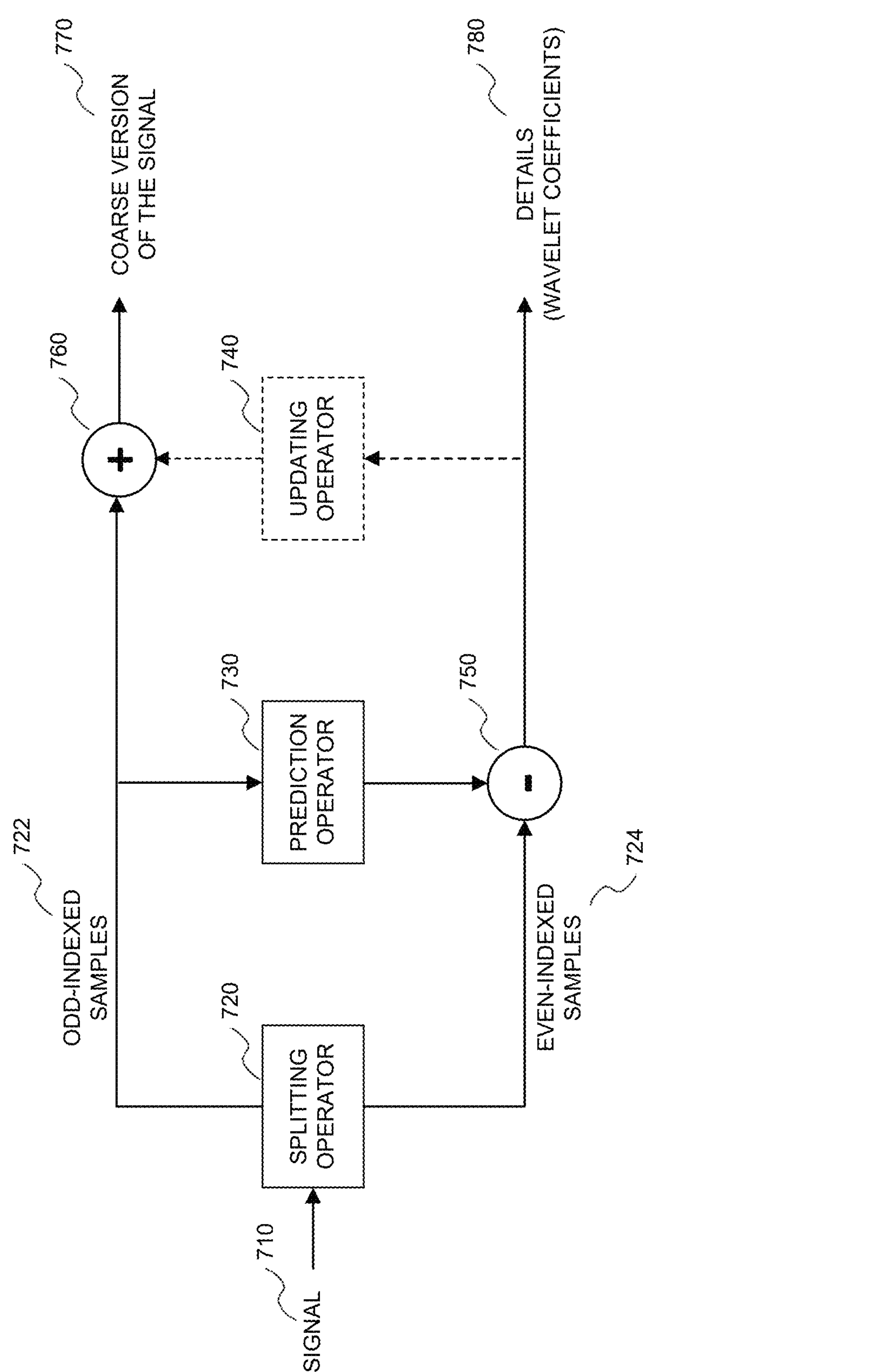
FIG. 7 is a functional block diagram of an example lifting transformer, according to aspects of the present disclosure.

FIG. 7 is a functional block diagram of an example forward lifting transformer 700. The forward lifting transformer 700 is applied to an original signal 710—herein the signal represents displacement data 510, including the x, y, and z components (treated separately) of the displacement vectors d(i). As illustrated, the forward lifting transformation begins by splitting the signal 710 into odd-indexed samples 722 (that constitute a coarse version of the signal) and even-indexed samples 724, using a splitting operator 720. As a result of the splitting operation 720, each group 722, 724 contains half the samples of the original signal 710. Note that, in the context of a mesh, the odd-indexed samples 722 and the even-indexed samples 724 correspond to vertices at different resolution levels. The odd-indexed samples normally correspond to vertices at a lower resolution level (analogous to the result of a low-pass filter in a traditional wavelet transformation) and the even-indexed samples correspond to vertices at a higher resolution level. For example, in reference to FIG. 2, odd-indexed samples can be vertices 210 and 220, and the even-indexed sample (that is predicted based on its odd-indexed parents 210 and 220) can be vertex 240.

Following the splitting operation 720, a prediction operator 730 is employed to predict the even-indexed samples 724 based on odd-indexed samples. This prediction can be expressed as follows:

$$\text{Signal}_{pred}(v_{12}) = \frac{1}{2}(\text{Signal}(v_1) + \text{Signal}(v_2)), \tag{12}$$

where $v_{12}$ represents a new vertex that is added in the middle of the edge ($v_1$, $v_2$), and where $\text{Signal}_{pred}(v_{12})$, $\text{Signal}(v_1)$, and $\text{Signal}(v_2)$ represent the values of the signals (that is, displacement values) of vertices $v_{12}$, $v_1$, and $v_2$, respectively. Thus, according to equation (2), the predicted signal value of vertex $v_{12}$, $\text{Signal}_{pred}(v_{12})$, is the average of the signal values of vertices $v_1$ and $v_2$. Next, to obtain the wavelet coefficients 780, prediction results (outputs of the prediction operator 730) are subtracted 750 from the respective even-indexed samples. Thus, the wavelet coefficient $w_{12}$ that is associated with vertex $v_{12}$ can be expressed as follows:

$$\text{Signal}(w_{12}) = \text{Signal}(v_{12}) - \text{Signal}_{pred}(v_{12}) = \text{Signal}(v_{12}) - \frac{1}{2}(\text{Signal}(v_1) + \text{Signal}(v_2)), \tag{3}$$

where $\text{Signal}(v_{12})$ represents the actual value of the signal (displacement) of vertex $v_{12}$, and where $\text{Signal}(w_{12})$ represents the value of the wavelet coefficient $w_{12}$. Hence, as shown in equation (3), the value of the wavelet coefficient represents the difference between the actual and the predicted signal values of vertex $v_{12}$. Note that the value of this wavelet coefficient is computed separately for each of the x, y, and z components of the signal values (displacements) that are associated with the newly added vertex $v_{12}$ and vertices $v_1$ and $v_2$.

The wavelet coefficients 780 may be added back 760 to the odd-indexed samples 722 by the updating operator 740. This update is optional and is typically carried out to recover some of the energy lost during signal splitting. For example, in the test model, the updating operation is as follows:

$$\text{Signal}(v) = \text{Signal}(v) + \frac{1}{8}\sum\nolimits_{w \in v^*} \text{Signal}(w) \tag{4}$$

where $w \in v^*$ indicates the set of wavelet coefficients for the vertices in the neighborhood of vertex v. The forward lifting transform 700 can then be applied again to the coarse version of the signal 770.

As described in reference to FIG. 5, in the test model, the wavelet coefficients, once generated 520, are encoded—that is, quantized 530, packed 540, and then the packed quantized coefficients are coded by a 2D video encoder 550. Some of the shortcomings of this approach are identified herein as follows:

The hierarchical nature of the wavelets computed over a recursive subdivision structure is not taken advantage of when coding the wavelet coefficients. While in the test model there is a proposal to traverse the wavelet coefficients from low to high frequency when packing them into 2D images, this does not take into account parent-child relationships among coefficients at different resolution levels. However, these relationships allow prediction of the importance of a child coefficient given its parents' importance, which can be exploited to achieve an efficient coding mechanism. Indeed, it is not clear that directly packing the wavelet coefficients into 2D images and using a 2D video coder is the optimal way of encoding these coefficients in terms of minimizing their entropy (at least not in the intra-frame coding scenario).

The current organization of wavelet coefficients into 2D images also does not easily lend itself to a progressive reconstruction at the decoder, where both resolution scalability (the number of vertices and faces) across different resolution levels and quality scalability (the precision/accuracy of the reconstructed vertex positions) within a resolution level are possible. However, these functionalities could be very important for current and future applications of dynamic meshes, where different users most likely have different computing powers, connection bandwidths, or quality needs. In such applications, users should have the power to stop the transmission of data when they are satisfied with the quality of the reconstructed mesh(es) and/or they have reached a bitrate budget that they cannot exceed.

In the test model, the decoder carries out a uniform refinement of the mesh at every resolution level. That is, each face of the mesh is subdivided at each subdivision iteration, regardless of whether or not (or the degree in which) the surface actually changes between different resolution levels at all of these locations. This results in many more triangles than are needed in the reconstructed meshes, which creates unnecessary processing at the decoder end.

Hence, improvements to the manner in which the wavelet coefficients are encoded are disclosed herein, where the above-mentioned shortcomings are addressed as follows:

An alternative method for coding the wavelet coefficients is disclosed herein, where a zerotree coding method is used. The zerotree coding method was first proposed by Shapiro in 1993 for image wavelet-based encoding. See, J. M. Shapiro, "Embedded Image Coding Using Zerotrees of Wavelet Coefficients," IEEE Transactions on Signal Processing, vol. 41, no. 12, pp. 3445-3462, 1993 ("Shapiro"). Shapiro's proposed zerotree coding method was later extended by Khodakovsky et al. to subdivision wavelets applied to meshes. See, A. Khodakovsky et al., "Progressive Geometry Compression," in SIGGRAPH'00, New Orleans, Louisiana, USA, 2000 ("Khodakovsky"). The zerotree coding method ensures that the most important (highest-order) bits of the most important (largest-magnitude) wavelet coefficients are transmitted first as these bits usually make the most significant contributions towards reducing reconstruction error. This method essentially provides bit-plane coding within each resolution level, which allows quality scalability within a resolution level, in addition to the resolution scalability that is naturally offered by the multiresolution wavelet decomposition. Herein, resolution scalability means an increasing number of mesh vertices and faces (which usually also means that the size of the faces is gradually reduced). Quality scalability means an increasing precision or accuracy in the reconstructed mesh data, including the vertex positions and the displacement vectors. Further aspects of the application of zerotree coding to progressive mesh encoding are described below (see FIGS. 12-13).

The established zerotree codes are used to perform an adaptive refinement (subdivision) of the reconstructed mesh at the decoder (or at the encoder). This means that instead of uniformly subdividing the mesh at every resolution level, we subdivide only in locations where there are significant wavelet coefficients. Further aspects of this adaptive mesh refinement are described below To accomplish the above-mentioned improvements, the mesh displacement encoder (of FIG. 5) and decoder (of FIG. 6) are replaced by a progressive mesh displacement encoder 800 and a progressive mesh displacement decoder 900, as described herein in reference to FIG. 8 and to FIG. 9, respectively.

Figure 8:
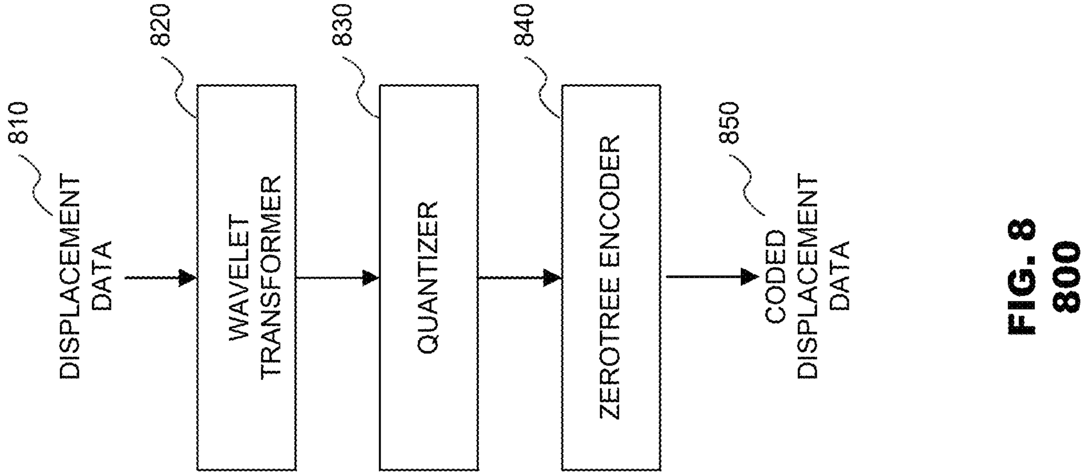
FIG. 8 is a functional block diagram of an example progressive mesh displacement encoder, according to aspects of the present disclosure.

FIG. 8 is a functional block diagram of an example progressive mesh displacement encoder 800—a modification disclosed herein of the test model's mesh displacement encoder 500, described in reference to FIG. 5. The progressive mesh displacement encoder 800 encodes displacement data 810. As mentioned above, these displacement data represent the spatial difference between the base mesh m(i) and the original mesh M(i) for a frame i—for example, the displacement vectors d(i) of FIG. 3. In the progressive mesh displacement encoder 800, the displacement data 810 are transformed by a wavelet transformer 820 and the resulting wavelet coefficients may then be quantized by a quantizer 830. The obtained quantized wavelet coefficients are then encoded by a zerotree encoder 840, generating a progressive bitstream of coded displacement data 850.

Figure 9:
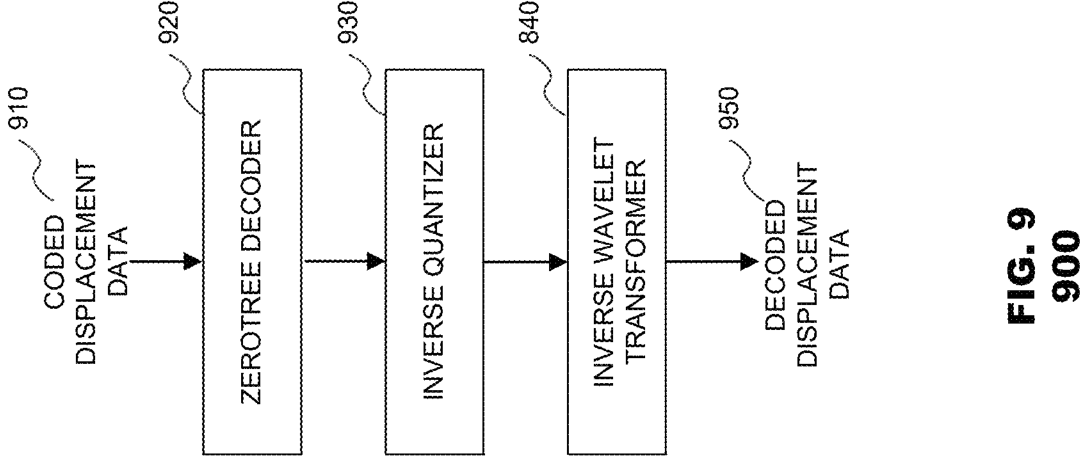
FIG. 9 is a functional block diagram of an example progressive mesh displacement decoder, according to aspects of the present disclosure.

FIG. 9 is a functional block diagram of an example progressive mesh displacement decoder 900—a modification disclosed herein of the test model's mesh displacement decoder 600, described in reference to FIG. 6. The progressive mesh displacement decoder 900 generally reverses the operation of the progressive mesh displacement encoder 800. Accordingly, the progressive mesh displacement decoder 900 employs a zerotree decoder 920 to progressively decode the quantized wavelet coefficients from the coded displacement data 910. The decoded quantized wavelet coefficients may be dequantized by an inverse quantizer 930. The obtained decoded wavelet coefficients are then inverse transformed by an inverse wavelet transformer 940, generating the decoded displacement data 950—for example, the reconstructed displacement vectors d"(i) of FIG. 3. The operation of the progressive mesh displacement encoder 800 and decoder 900 is explained in further detail below.

The zerotree encoder 840 of the progressive mesh displacement encoder 800 employs a zerotree algorithm to code the quantized wavelet coefficients, generated by the wavelet transformer 820 and the quantizer 830, as described above. Typically, zerotree coding is a lossy compression algorithm applicable for hierarchical sub-band decomposition, such as the one generated by a discrete wavelet transform. It is lossy because it processes discrete values, such as the quantized transform coefficients. In the atypical case where the coefficients are integer values and no quantization is applied, zerotree coding is a lossless process because the zerotree algorithm itself is a lossless operation. However, lossy compression may come about if the bitstream generated by the zerotree algorithm is truncated, for example, where a predefined target bitrate and/or target distortion measure are met. Hence, the zerotree coding process may be employed in accordance with a pre-defined target bitrate and/or quality requirements and may be ended when these requirements are met (or else the decoder can be set to stop decoding when its own bitrate and/or quality requirements are met). The zerotree algorithm provides a progressive and multi-resolution coding of the displacement data 810 that the wavelet coefficients represent by utilizing this representation's hierarchy. Central to the zerotree algorithm is a technique for encoding significance maps, described herein in reference to FIG. 10.

Figure 10:
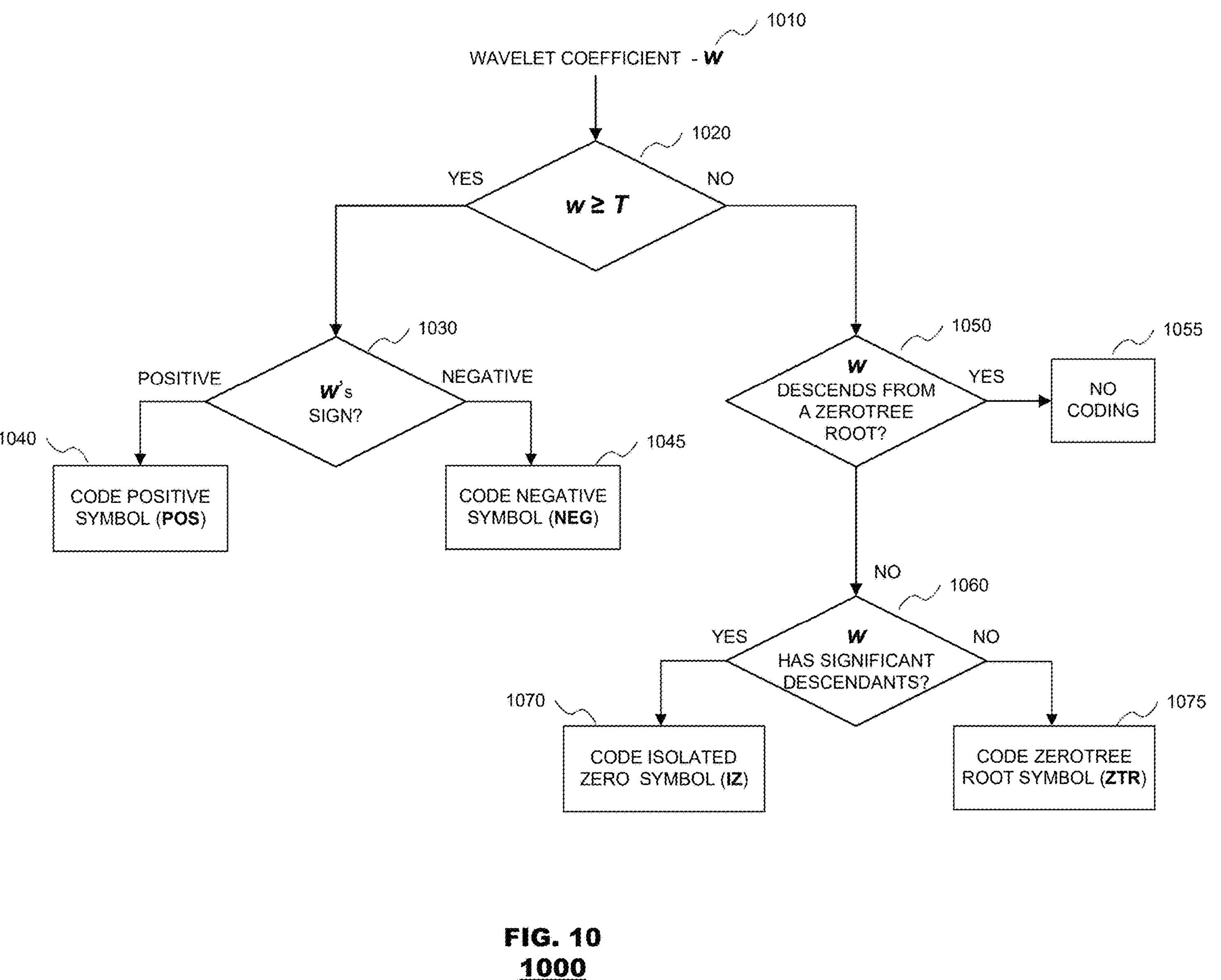
FIG. 10 is a flow diagram, illustrating significance map encoding, according to aspects of the present disclosure.

FIG. 10 is a flow diagram, illustrating significance map encoding 1000. To code a significance map, a respective threshold T should be set to determine what is considered a "significant" wavelet coefficient magnitude w. This threshold is then progressively reduced during the coding of successive significance maps. The coding of a significance map is carried out by following a binary decision tree (that is, performing a sequence of binary decisions) through which wavelet coefficients are labeled by four different possible labels (that can be coded by 2 bits each), as follows:

1) ZTR (Zerotree Root). A wavelet coefficient that is deemed insignificant—that is, its magnitude and the magnitudes of all its children and other descendants are below a threshold T—is labeled by the label ZTR. Since the children and the other descendants of an insignificant wavelet coefficient are also deemed insignificant, specifying a ZTR label allows the decoder to track down and to automatically zero all the descendent coefficients so that these coefficients do not need to be reconstructed. Because the encoder and the decoder are expected to follow the same hierarchical structure for scanning the wavelet coefficients, the encoder needs only to tell the decoder where a zerotree root lies, and the decoder can use this to determine where all the descendant zeros on the tree lie by following the known hierarchical structure.
2) POS (Positive Significant Coefficient). A wavelet coefficient whose magnitude is considered significant (according to the threshold T) and its sign is positive is labeled by the label POS.
3) NEG (Negative Significant Coefficient). A wavelet coefficient whose magnitude is considered significant (according to the threshold T) and its sign is negative is labeled by the label NEG.
4) IZ (Isolated Zero). A wavelet coefficient that is insignificant (according to the threshold T) but has one or more significant descendants is labeled by the label IZ. This occurrence is normally considered to be rare.

For example, a wavelet coefficient w 1010, if determined 1020 to be significant—that is, $w \geq T$—and if determined 1030 to be of positive sign, is coded using a positive symbol (POS) 1040. Otherwise, the wavelet coefficient, if determined 1020 to be significant and if determined 1030 to be of negative sign, is coded using a negative symbol (NEG) 1045. However, if the wavelet coefficient is determined 1020 to be insignificant, then it is next determined whether the wavelet coefficient descends from a zerotree root 1050. If the insignificant wavelet coefficient indeed descends from a zerotree root, as explained above, there is no need to code this coefficient 1055. But, if the insignificant wavelet coefficient does not descend from a zerotree root, it is next determined whether the wavelet coefficient has one or more significant descendants 1060. If the wavelet coefficient has one or more significant descendants, then it is coded using an isolated zero symbol (IZ) 1070, otherwise it is coded using a zerotree root symbol (ZTR) 1075.

The coded binary tree described above is constructed at the encoder 840 through a series of "dominant" (or significance) passes and "subordinate" (or refinement) passes, and at each iteration the significance threshold T is updated (usually reduced by a factor of 2). The dominant pass encodes the significance of wavelet coefficients that have not yet been found significant in earlier iterations by scanning the hierarchical coefficient tree and emitting one of the four possible symbols (ZTR, POS, NEG, or IZ), as described above. The subordinate pass then emits one bit (representing the next most significant bit that has not yet been emitted) for each coefficient that has been deemed significant so far (i.e., each coefficient that was labelled by a POS or a NEG symbol). These bits are known as refinement bits, as the subordinate pass is essentially a form of bit-plane coding. The total number of possible subordinate passes depends on the final quantization level of the coefficients.

The final bitstream generated by the zerotree encoder 840 includes data in order of importance: first, the most significant bit of the most significant wavelet coefficient, and, last, the least significant bit of the least significant wavelet coefficient. Due to this progressive order of the data, the encoder 800 (or 840) can terminate the encoding at any point. For example, the encoder can terminate the encoding when a target bitrate and/or a target distortion measure have been met. Generally, the greater the number of bits that are encoded, the better the signal reconstruction is. Likewise, the decoder 900 (or 920) can choose to stop receiving or decoding the bitstream generated by the encoder 800 (or 840) when the quality of the already decoded data is satisfactory and/or when a current bitrate cannot be exceeded. This is because the decoder can reconstruct the signal based on any prefix of the bitstream, running an inverse wavelet transform on the wavelet coefficient bits analyzed so far.

In Khodakovsky it was observed that since for images (such as in the original zerotree coding work in Shapiro) the wavelet coefficients are associated with a quadrilateral face, the hierarchical coefficient trees as described above follow naturally from the face quadtree. (That is, each higher-resolution level quadrant of the image is obtained by splitting the above lower-resolution quadrant of the image into 4 sub-quadrants.) A similar concept can also be used for dual (i.e., face-based) subdivision schemes. Further details about dual subdivision schemes can be found in N. A. Dodgson et al., "Characteristics of dual √3 subdivision schemes," in Fifth International Conference on Curves & Surfaces, St Malo, France, 2002 ("Dodgson"). But, when the subdivision scheme and the associated wavelet transform are vertex-based, the tree needs to be constructed differently. This is because the mesh vertices do not have a natural tree structure. However, as disclosed herein, the mesh edges do have a natural tree structure in the case where a mesh has subdivision connectivity.

The subdivision wavelet coefficients at a given resolution level have a one-to-one association with the edges of the mesh at the previous resolution level, since the wavelet coefficients are computed relative to vertices that are each inserted at the midpoint of an edge of the coarser-resolution level of the mesh. In this case, assuming a triangular mesh (i.e., with triangular faces) and a recursive subdivision of each face into 4 sub-faces, we can consider each edge at a given resolution level to be the parent of 4 edges of the same orientation in the next higher-resolution mesh. In aspects disclosed herein, a parent-child relationship is based on edges (not vertices) when constructing a zerotree hierarchy used for zerotree coding, as further described in reference to FIG. 11.

Figure 11:
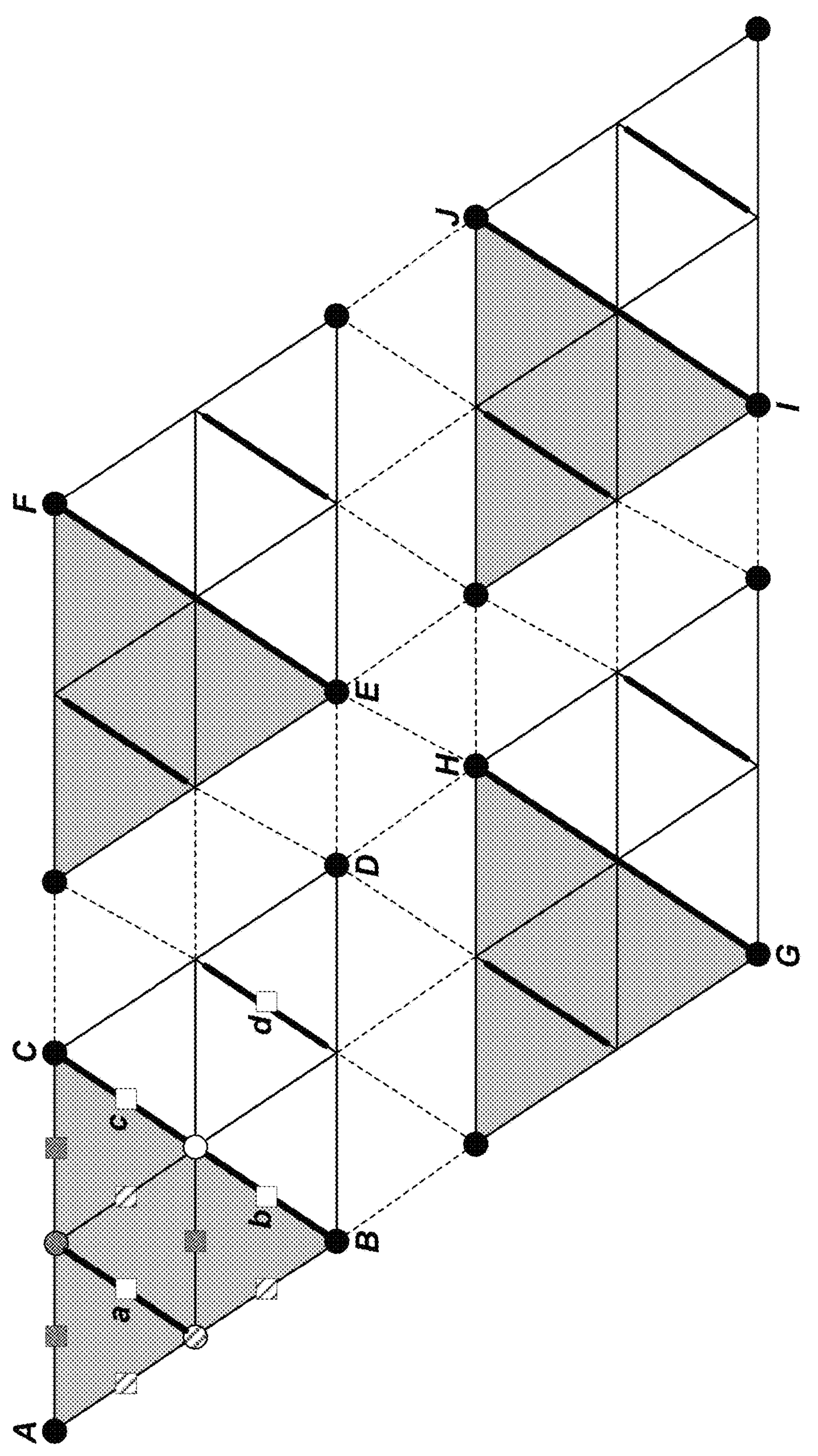
FIG. 11 is a diagram, illustrating a zerotree hierarchy used for zerotree coding, according to aspects of the present disclosure.

FIG. 11 is a diagram, illustrating a zerotree hierarchy 1100 used by the zerotree encoder 840) and decoder 920. The zerotree hierarchy 1100 includes edge-based trees, each associated with an edge of a base mesh, and each is constructed according to edge-based parent-child relationship in a triangular mesh. In the example of FIG. 11, edge parents (such as BC, AB, AC, BD, EF, GH, or IJ) represent edges of the base mesh, and two triangles at the same resolution level in the mesh domain are labeled, ABC and BDC. Each of these triangles is divided into four triangles at a next (higher) resolution level. In an edge-based tree associated with edge BC, the edge BC is the parent of the four sub-edges that are in the same orientation at the higher resolution level—that is, the sub-edges labelled a, b, c, and d in FIG. 11. Note that in a case where the mesh is an open mesh, an edge parent can be the parent of fewer than four sub-edges at the boundary of the mesh. Thus, an edge parent groups wavelet coefficients of a fixed wavelet sub-band from its two incident triangles in the same resolution level, as further demonstrated below.

For example, in FIG. 11, assuming that the base mesh vertices (black filled circles) are at resolution level L0. Then the only wavelet coefficient at the next higher resolution level (L1) that is associated with the parent base edge BC is the wavelet coefficient that corresponds to the midpoint of that edge (i.e., the vertex indicated by the white circle at the midpoint of edge BC in FIG. 11). The wavelet coefficients at the following higher resolution level (L2), that are associated with the base edge BC, are the wavelet coefficients that correspond to the midpoints of the child edges a, b, c, and d in FIG. 11 (indicated by the white squares in FIG. 11). A similar process can be followed to determine the wavelet coefficients associated with the other base edges of the triangles ABC and BDC in FIG. 11. For example, for the base edge AB, the wavelet coefficient associated with this edge at level L1 corresponds to the vertex at the midpoint of this edge indicated by the striped circle in FIG. 11. The wavelet coefficients associated with the base edge AB at level L2 correspond to the vertices at the midpoints of the child edges as indicated by the striped squares in FIG. 11. If the base edge AB is a boundary edge (as shown in FIG. 11), it has only 3 child edges at the next resolution level, not 4-similarly for the base edge AC. For the base edge AC in FIG. 11, the wavelet coefficient associated with this edge at level L1 is at the vertex indicated by the dotted circle in FIG. 11, and the wavelet coefficients associated with this base edge at level L2 are at the vertices indicated by the dotted squares in FIG. 11. Note that for each base edge we only consider children and other descendant edges of the same orientation as the base edge, such that no wavelet coefficient is accounted for multiple times or left out.

Aspects disclosed herein are not limited to any particular type of subdivision scheme. The manner in which the parent-child relationships are established to form the zerotree hierarchy used for the zerotree coding can be defined based on the kind of subdivision scheme that is used to generate the wavelet coefficients.

Zerotree coding requires no training, no pre-stored codebooks or tables, and no prior knowledge of the input source, which makes it a very convenient coding mechanism. It is also very effective at exploiting parent-child correlations to obtain an efficient coding scheme that takes into account the natural hierarchical structure of the wavelet coefficients. Significance bits, generated by the dominant passes, can be further coded by using an entropy coder such as arithmetic coding, which can allow for a fractional number of bits per symbol instead of the default 2 bits per symbol. Refinement bits, generated by the subordinate passes, are usually random enough so that entropy coding may provide no further coding gain, but it can sometimes be beneficial. The success of the zerotree coder depends on the observation that the distribution of wavelet coefficients is usually centered around zero and their magnitude decays at higher resolution levels (with the rate of decay being dependent on the smoothness of the original mesh surface).

In an aspect, the following steps may be carried out by the zerotree encoder 840 of FIG. 8 to produce zerotree codes:

Step C1: Take out from the wavelet coefficients (e.g., the quantized wavelet coefficients fed to the zerotree encoder 840) those coefficients that represent displacements associated with vertices of the base mesh (e.g., vertices indicated by the black circles in FIG. 11). Since these displacements are associated with vertices of the base mesh and not with the edges, they can be excluded from the zerotree coding and can be coded separately (e.g., using a suitable entropy coder).

Step C2: Construct a zerotree hierarchy using the base mesh as a starting point. The constructed zerotree hierarchy includes edge-based trees of respective mesh base edges. Thus, each edge of the base mesh serves as the starting point of a new edge-based tree. To that end, for each base mesh edge, the edge's children and further descendant edges are found in all the subsequent resolution levels (subdivisions) of the mesh, following the process described with respect to FIG. 11.

Step C3: An initial threshold $T=T_0$ is selected, based on which it is determined whether a wavelet coefficient magnitude is significant. Typically, $T_0$ is selected to be: $T_0=2^{\lfloor log_2(c_{max})\rfloor}$, where $c_{max}$ is the largest-magnitude coefficient of the wavelet coefficients. However, other values for $T_0$ may be determined. In an aspect, different initial thresholds may be computed for respective x, y, and z components of the wavelet coefficients. The initial threshold(s) may be transmitted to or independently derived by the decoder.

Step C4: Optionally, a target bitrate B and/or a target distortion measure D are set. Alternatively, the encoder can encode all the data of the wavelet coefficients and the decoder can stop the bitstream transmission (or decoding operation) when the already reconstructed signal has reached a predetermined quality level and/or has reached a bitrate limit of the decoder.

Step C5: The wavelet coefficients are traversed, following the zerotree hierarchy constructed in step C2 and in a traversal order that is known to the decoder. The traversed coefficients' coordinates (i.e., coordinates of vertices that the wavelet coefficients are associated with) are then put into an initial dominant list. Note that the scanning order should be such that no child node is scanned before its parent node in each edge-based tree of the zerotree hierarchy, and all nodes in a given sub-band (resolution level) of the edge-based trees are scanned before moving onto the next resolution level.

Step C6: A dominant (i.e., significance) pass is performed, where, as described in reference to FIG. 10, the wavelet coefficients in the dominant list are labeled as one of: POS 1040, NEG 1045, ZTR 1075, or IZ 1070, according to the threshold T. Each of these symbols can be coded by 2 bits, e.g., 00 (for POS), 01 (for NEG), 10 (for ZTR), and 11 (for IZ). If a coefficient is labelled ZTR, none of its descendants are labeled, since they are all considered insignificant 1050, 1055. This step generates the significance bits containing the coded symbols. This step is separately performed for the x, y, and z components of the wavelet coefficients. Therefore, the total number of edge-based trees can be three times the number of base mesh edges (that is, each edge of the base mesh corresponds to three edge-based trees). Hence, the x, y, and z components of the wavelet coefficients can be processed separately in the dominant and in the subordinate passes, and the results for each component are encoded separately because such an approach tends to perform better than applying a method such as vector quantization method where the three components are treated and encoded together (as shown by Khodakovsky).

Step C7: The sequence of coded dominant symbols (i.e., the significance bits generated by the dominant pass) is entropy-coded, using, for example, an adaptive arithmetic coder. The generated bitstream is then sent (or stored and later sent) to the decoder. In order to maintain progressivity, the entropy-encoded significance bits (of each dominant pass) that correspond to the x, y and z wavelet coefficient components may be interleaved before transmission to the decoder.

Step C8: For all the coefficients that were found to be significant (i.e., POS or NEG) in the dominant pass, their coordinates are removed from the dominant list and their magnitudes are put into a subordinate list (separately for the x, y, and z components). These significant coefficient values are set to 0 in the original wavelet coefficient hierarchy (i.e., the constructed zerotree hierarchy) so that they will not be considered again in the following dominant pass (if there is one).

Step C9: A subordinate (i.e., refinement) pass is performed for all coefficient values in the subordinate list corresponding to each component x, y, and z separately. Since it is known that no coefficients have magnitudes greater than $2T_0$, the "uncertainty interval" for the significant coefficient magnitudes from the dominant pass is $[T_0, 2T_0)$ (where the squared bracket indicates that the value of $T_0$ is included in this interval and the parenthesis indicates that the value of $2T_0$ is excluded from this interval). The magnitudes of the significant coefficients are known to be within this interval. The subordinate pass refines the magnitudes of the significant coefficients by indicating whether they lie in the bottom half of the uncertainty interval (i.e., in $[T_0, T_0+T_0/2)$) and thus outputting a "0" bit or whether they lie in the top half of the Interval (i.e., in $[T_0+T_0/2, 2T_0)$) and thus outputting "1" bit. The order of refinement bits that are outputted in this refinement pass follows the output order of the significant coefficients from the corresponding dominant pass. Note that if multiple dominant and refinement passes are performed, then at each iteration, the subordinate list will contain significant coefficient magnitudes from previous passes as well; and these will be iteratively refined with each new refinement pass, using the uncertainty intervals associated with each new threshold.

Step C10: After the subordinate pass is concluded, the values in the subordinate list can be reordered such that larger-magnitude coefficients appear before the smaller-magnitude ones, with the constraint that this can be carried out in the same way at the decoder. Since the subordinate pass halves the uncertainty interval, the decoder can only rearrange values in the subordinate list based on whether they are in the bottom or top half of the uncertainty interval: the encoder can only rearrange these values using the same method.

Step C11: The refinement bits generated by the subordinate pass may be entropy-coded. The generated bitstream is then sent (or stored and later sent) to the decoder. Entropy-coding the refinement bits may be beneficial even though the bits generated by the subordinate pass are usually too random. In order to maintain progressivity, the refinement bits (of each subordinate pass) that correspond to the x, y and z wavelet coefficient components may be interleaved before transmission to the decoder.

Step C12: Next, a new significance threshold $T=T_1$ is set for the next dominant pass, for example, $T_1=T_0/2$. Other values for $T_1$ may be determined (e.g., other $T_1$ values, reproducible at the decoder in a predictable manner to avoid the need of coding such values into the bitstream). In an aspect, different significance thresholds $T_1$ may be computed for respective x, y, and z components of the wavelet coefficients. The new significance threshold(s) may be transmitted to or derived by the decoder.

Step C13: Steps C6-C11 are repeated (using the new significance threshold(s) computed in step C12) until the length of the uncertainty interval for the subordinate pass is 1 or until some desired number of dominant and refinement passes have been carried out or until the target bitrate/reconstruction quality level associated with the wavelet coefficients has been reached (if this was set in step C4). In the last case, the encoder would need to measure the bitrate and/or reconstruct the signal before each new dominant pass.

The zerotree decoder 920 of FIG. 9, generally, reverses the process performed by the zerotree encoder 840 of FIG. 8. In an aspect, the following steps may be carried out at the zerotree decoder:

Step D1: Construct the zerotree hierarchy using the base mesh as the starting point, as is done by the encoder in step C2.

Step D2: Parse the received bitstream and extract the data generated by the dominant passes (entropy-encoded significance bits) and by the refinement passes (entropy-encoded (or not entropy-encoded) refinement bits) for each of the x, y, and z components of the wavelet coefficients. If available, extract from the bitstream also the data corresponding to the separately encoded displacements associated with the vertices of the base mesh and entropy-decode the extracted data.

Step D3: Entropy-decode the extracted data (in step D2) to obtain the significance bits, representing the dominant symbols generated in respective dominant passes (see step C6). These dominant symbols indicate the positions of the (quantized) significant wavelet coefficients within the constructed zerotree hierarchy and according to the traversal order that is common to both the encoder and the decoder. If a given tree node does not receive a symbol, it can be assumed to be a zerotree root (ZTR).

Step D4: Entropy-decode the extracted data (in step D2), if entropy-encoded at the encoder, to obtain the refinement bits, representing the (quantized) magnitude values of the significant wavelet coefficients generated in respective refinement passes (see step C9). To reconstruct the wavelet coefficient magnitudes, the centers of the uncertainty intervals, corresponding to the thresholds for the current dominant pass, are used. Note that the magnitudes of all the decoded coefficients that are associated with a "zerotree root" (ZTR) symbol, as well as all of their descendants, will automatically be set to 0 at the decoder. This is a key aspect of the zerotree coding mechanism, which enables zeroing out insignificant coefficients at the decoder without having to transmit data for these coefficients.

Step D5: Steps D2-D4 are repeated as determined by the decoder. As mentioned above, the decoder can stop the decoding process at any point where the quality of the already reconstructed coefficient values is sufficient, the bitrate limit of the decoder has been reached, and/or some predefined number of dominant and refinement passes has been reached. Because the received bitstream is "embedded" (that is, upon decoding of bits from a new set of a dominant pass and a subordinate pass, the whole mesh surface is reconstructed at a certain level of detail or quality) the reconstruction of the mesh becomes progressively more accurate as more bits are decoded.

During the reconstruction of the mesh, the mesh refinement can be adaptive, as disclosed herein. When reconstructing the mesh (e.g., by the mesh reconstructor 355 of the system 300 for dynamic mesh encoding shown in FIG. 3 or by the mesh reconstructor 460 of the system 400 for dynamic mesh decoding shown in FIG. 4), instead of uniformly subdividing the mesh at each subdivision iteration (as in the test model), the mesh is subdivided adaptively as follows. The significance bits received from the zerotree encoder 840 can be used to determine whether or not to subdivide, and where to subdivide, the mesh at each resolution level. In an aspect, the mesh will be subdivided only in locations associated with significant wavelet coefficients (POS or NEG) or an isolated zero (IZ). Locations associated with insignificant wavelet coefficients (ZTR) need not be subdivided further since it has already been determined (during the zerotree encoding process) that there are no significant surface deformations in these locations at higher resolution levels. For example, and in reference to FIG. 2, a mesh face in a mesh subdivision at a certain resolution level (e.g., the triangle depicted in gray) may be divided based on the significance of the wavelet coefficients that are associated with the splitting of that mesh face (e.g., the depicted wavelet coefficient w).

The process described above results in an adaptive triangulation of the reconstructed mesh, where highly detailed areas will be represented by a dense collection of small triangles, while smoother/flatter areas will be represented by a smaller number of large triangles. No additional data apart from the zerotree coding bits need to be sent to the decoding system 400 to enable this adaptive refinement.

Figure 12:
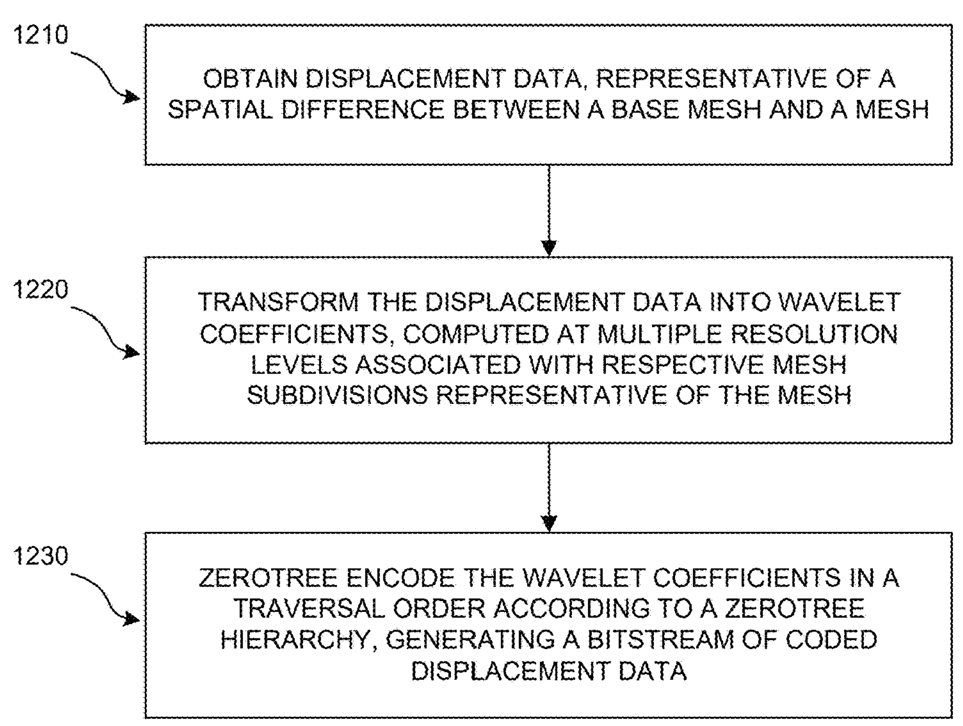
FIG. 12 is a flow diagram of an example method for progressively encoding a mesh, according to aspects of the present disclosure.

FIG. 12 is a flow diagram of an example method 1200 for progressively encoding a mesh, according to aspects of the present disclosure. The method 1200 begins, in step 1210, by obtaining displacement data. The displacement data represent a spatial difference between a base mesh and a mesh to be progressively encoded. Next, in step 1220, the obtained displacement data are transformed into wavelet coefficients that are computed at multiple resolution levels associated with respective mesh subdivisions representative of the mesh. The method 1200 proceeds, in step 1230, with zerotree encoding of the wavelet coefficients in a traversal order according to a zerotree hierarchy, generating a zerotree bitstream of coded displacement data. In an aspect, the zerotree hierarchy is constructed relative to the base mesh, as described in reference to FIG. 11. Based on the zerotree hierarchy, in step 1230 of the zerotree encoding, significance information for the wavelet coefficients can be determined. In a further aspect, the significance information for the wavelet coefficients can be used to adaptively reconstruct the mesh. For example, it can be determined whether to divide a mesh face (in one of the mesh subdivisions) based on significance information determined for wavelet coefficients that are associated with splitting that mesh face.

Figure 13:
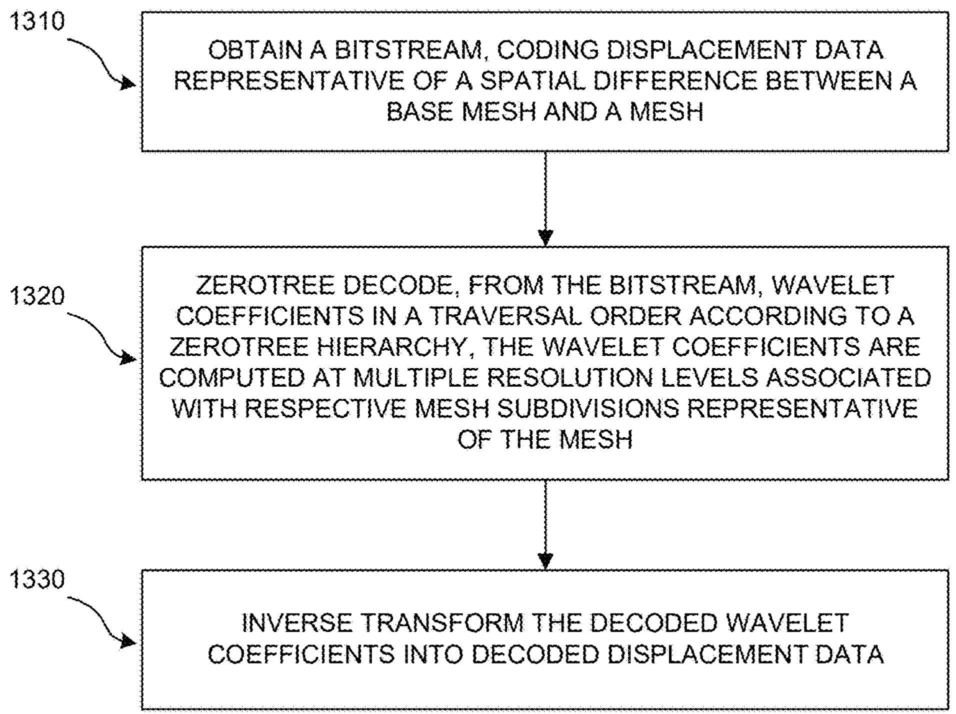
FIG. 13 is a flow diagram of an example method for progressively decoding a mesh, according to aspects of the present disclosure.

FIG. 13 is a flow diagram of an example method for progressively decoding a mesh 1300, according to aspects of the present disclosure. The method 1300, in step 1310, begins by obtaining a zerotree bitstream. The zerotree bitstream codes displacement data representative of a spatial difference between a base mesh and a mesh to be progressively decoded. Next, in step 1320, the wavelet coefficients are zerotree decoded from the bitstream in a traversal order according to a zerotree hierarchy. The decoded wavelet coefficients are represented at multiple resolution levels associated with respective mesh subdivisions representative of the mesh. Then, in step 1330, the decoded wavelet coefficients are inverse transformed into decoded displacement data. In an aspect, the zerotree hierarchy is constructed relative to the base mesh, as done by the encoder 1200 and as described in reference to FIG. 11. Based on the zerotree hierarchy, in step 1320 of the zerotree decoding, significance information for the wavelet coefficients can be determined. In a further aspect, the significance information for the wavelet coefficients can be used to adaptively reconstruct the mesh. For example, it can be determined whether to divide a mesh face (in one of the mesh subdivisions) based on significance information obtained for wavelet coefficients that are associated with the splitting of that mesh face.

A zerotree bitstream syntax for zerotree data generated by the zerotree coding of an input mesh sequence is next described. The zerotree bitstream syntax disclosed herein can also be used in the context of a more general subdivision wavelet framework. Note that in the zerotree bitstream syntax presented below, the segments of zerotree data that correspond to the x, y, and z components of the wavelet coefficients are not interleaved.

Non-progressive zerotree coding (lossy). Zerotree coding can be applied to code wavelet coefficients in a subdivision wavelet framework (as described in the test model) even if progressive coding is not required. To make use of zerotree coding in a non-progressive coding scenario, just one dominant pass and one refinement pass need be performed. In this case, the initial significance threshold $T_0$ may be adjusted to ensure that enough wavelet coefficients will be determined significant to obtain a sufficiently good result for the target application. Thus, the selection of an initial threshold is application-dependent and also dependent on the input mesh models.

A syntax for using a mesh zerotree coder for non-progressive zerotree coding (including one dominant pass and one refinement pass) is presented below. Note that in this case the reconstruction of the wavelet coefficients at the decoder is lossy (also because the wavelet coefficients are quantized before compression). The non-progressive zerotree bitstream is organized as follows:

| Possible dominant symbol alphabet cases: | | | |
|---|---|---|---|
| Alphabet size | Alphabet | 3-bit code (codes alphabet and implicitly alphabet size) | |
| 1 | 3 | 000 | (state 0) |
| 2 | 0, 3 | 001 | (state 1) |
| 2 | 1, 3 | 010 | (state 2) |
| 3 | 0, 1, 3 | 011 | (state 3) |
| 3 | 0, 2, 3 | 100 | (state 4) |
| 3 | 1, 2, 3 | 101 | (state 5) |
| 4 | 0, 1, 2, 3 | 110 | (state 6) |

SYNTAX FOR ONLY 1 DOMINANT PASS AND 1 REFINEMENT PASS FOR EACH ZEROTREE:
(If state = 0 above, we would not transmit anything (apart from the base mesh displacements) since this would mean that all the wavelet coefficients (for x, y, and z components) are insignificant, so they would all be set to 0 at the decoder - this is not likely to happen, since the initial significance thresholds are computed by taking into account the distribution of input wavelet coefficients and these should not all be 0, otherwise there is effectively no wavelet data)

```
Header:
 dx  dy  dz
[0/1][0/1][0/1]            (3 bits total)
if dx = 1:       [alph_x  (3-bit code, from table above)]
if dy = 1:       [alph_y  (3-bit code, from table above)]
if dz = 1:       [alph_z  (3-bit code, from table above)]
if dx = 1:
     [rlgr_ref_x (1 bit to indicate if RLGR is used (1) or not (0) to code ref. bits)]
if dy = 1:
     [rlgr_ref_y (1 bit to indicate if RLGR is used (1) or not (0) to code ref. bits)]
if dz = 1:
     [rlgr_ref_z (1 bit to indicate if RLGR is used (1) or not (0) to code ref. bits)]
*** The above fit into max. 15 bits (if dx & dy & dz = 1); pad any remaining empty bits with
zeros to get max. 2 bytes ***
*** In case only 1 flag (dx/dy/dz) = 1, all the data above fits into 1 byte; pad any remaining
   empty bits with zeros ***
if dx = 1:                [length_code_dx (uint16)][thresh_dx (uint8)]
if dy = 1:                [length_code_dy (uint16)][thresh_dy (uint8)]
if dz = 1:                [length_code_dz (uint16)][thresh_dz (uint8)]
if dx = 1:                [length_code_rx (uint16)]
if dy = 1:                [length_code_ry (uint16)]
if dz = 1:                [length_code_rz (uint16)]
Encoded data (payload):
if dx = 1:                [dom_sym_x_coded (uint8)](Arithmetic-coded)
if dy = 1:                [dom_sym_y_coded (uint8)](Arithmetic-coded)
if dz = 1:                [dom_sym_z_coded (uint8)](Arithmetic-coded)
if dx = 1:                [ref_bits_x_coded (uint8)](RLGR-coded/byte-packed directly)
if dy = 1:                [ref_bits_y_coded (uint8)](RLGR-coded/byte-packed directly)
if dz = 1:                [ref_bits_z_coded (uint8)](RLGR-coded/byte-packed directly)
if base disp.!= all 0:  [base_disp_coded (uint8)](RLGR-coded)
```

In the zerotree bitstream syntax above, the possible alphabets that can occur for the symbols in the dominant pass are first defined. These alphabets can be entropy coded (e.g., using adaptive arithmetic coding) in which case they need to be entropy decoded by the decoder. The used alphabet codes are: "0" (POS: positive significant coefficient), "1" (NEG: negative significant coefficient), "2" (IZ: isolated zero), and "3" (ZTR: zerotree root). In this syntax a 3-bit code is devised that encodes seven possible alphabet "states," each 3-bit code also implicitly encodes the size of the alphabet.

Next, a header for the zerotree bitstream is defined. In an aspect, the zerotree coder is applied to each frame of an input mesh sequence, and so a header associated with a zerotree bitstream of each frame is produced. The header contains the following data, in order:

1. dx, dy, and dz significance flags: These flags indicate whether significant wavelet coefficients ("POS" or "NEG") have been found for, respectively, the x, y, and z components of the input wavelet coefficients; if so, the corresponding flag is set to 1, otherwise it is set to 0. This part of the header, therefore, contains 3 bits in total. There is no need to precede each bit with a label because the decoder know that the 3 bits represent the ordered: dx, dy, dz. The rest of the header data is conditioned on the corresponding significance flag being equal to 1.
2. If dx=1: write the 3-bit alphabet code corresponding to the "state" of the dominant symbols for the x component of the wavelet coefficients. If dx=0, skip this step.
3. If dy=1: write the 3-bit alphabet code corresponding to the "state" of the dominant symbols for the y component of the wavelet coefficients. If dy=0, skip this step.
4. If dz=1: write the 3-bit alphabet code corresponding to the "state" of the dominant symbols for the z component of the wavelet coefficients. If dz=0, skip this step. Note that it is not likely to happen that dx, dy, and dz are all equal to 0—this would correspond to "state" 0, where all of the wavelet coefficients for all the x, y, and z components are considered insignificant. As mentioned above, this should not happen because the initial threshold for significance is chosen depending on the distribution of the input wavelet coefficients, so the only way that all the coefficients would be considered insignificant is if all the wavelet coefficients are all equal to 0.
5. If dx=1: write a 1 bit or 0 bit if entropy coding is used or not, respectively, to encode the refinement bits from the refinement pass for the x component of the wavelet coefficients. If dx=0, skip this step.
6. If dy=1: write a 1 bit or 0 bit if entropy coding is used or not, respectively, to encode the refinement bits from the refinement pass for the y component of the wavelet coefficients. If dy=0, skip this step.
7. If dz=1: write a 1 bit or 0 bit if entropy coding is used or not, respectively, to encode the refinement bits from the refinement pass for the z component of the wavelet coefficients. If dz=0, skip this step.

For example, entropy coding can be implemented by an RLGR (Run-Length Golomb-Rice) coding technique. When no entropy coding is applied to the refinement bits, the refinement bits are directly packed into bytes at the encoder. The choice whether to entropy code the refinement bits or to byte-pack them can be made based on comparing the resulting bitrate when entropy coding and when byte-packing the refinement bits.

8. The above part of the header data fits into a maximum of 15 bits (in the case when dx, dy, and dz are all equal 1). Pad any remaining empty bits with zeros to fill a maximum of 2 bytes.
9. In the case that only one of the dx, dy, and dz flags is equal to 1, the above part of the header data can fit into 1 byte: pad any remaining empty bits with zeros.
10. For the next part of the header, if dx=1: write the length of the entropy-coded sequence of dominant symbols for the x component of the wavelet coefficients as a "uint16" data type (i.e., 2 bytes), followed by the value of the initial threshold $T_0$ for the dominant pass for the x component as a "uint8" data type (i.e., 1 byte), assuming the threshold is within the range [0, 255]. If dx=0, skip this step.
11. If dy=1: write the length of the entropy-coded sequence of dominant symbols for the y component of the wavelet coefficients as a "uint16" data type (i.e., 2 bytes), followed by the value of the initial threshold $T_0$ for the dominant pass for the y component as a "uint8" data type (i.e., 1 byte), assuming the threshold is within the range [0, 255]. If dy=0, skip this step.
12. If dz=1: write the length of the entropy-coded sequence of dominant symbols for the z component of the wavelet coefficients as a "uint16" data type (i.e., 2 bytes), followed by the value of the initial threshold $T_0$ for the dominant pass for the z component as a "uint8" data type (i.e., 1 byte), assuming the threshold is within the range [0, 255]. If dz=0, skip this step.
13. If dx=1: write the length of the encoded (or byte-packed) refinement bits for the x component of the wavelet coefficients as a "uint16" data type (i.e., 2 bytes). If dx=0, skip this step.
14. If dy=1: write the length of the encoded (or byte-packed) refinement bits for the y component of the wavelet coefficients as a "uint16" data type (i.e., 2 bytes). If dy=0, skip this step.
15. If dz=1: write the length of the encoded (or byte-packed) refinement bits for the z component of the wavelet coefficients as a "uint16" data type (i.e., 2 bytes). If dz=0, skip this step.

Following the header as defined above, the next part of the zerotree bitstream syntax contains the payload (i.e., the actual encoded data), written in the following order:

1. If dx=1: write the entropy-encoded sequence of dominant pass symbols (i.e., significance bits) for the x component of the wavelet coefficients (e.g., using the adaptive arithmetic coding technique) as a sequence of bytes ("uint8" data type). If dx=0, skip this step.
2. If dy=1: write the entropy-encoded sequence of dominant pass symbols (i.e., significance bits) for the y component of the wavelet coefficients (e.g., using the adaptive arithmetic coding technique) as a sequence of bytes ("uint8" data type). If dy=0, skip this step.
3. If dz=1: write the entropy-encoded sequence of dominant pass symbols (i.e., significance bits) for the z component of the wavelet coefficients (e.g., using the adaptive arithmetic coding technique) as a sequence of bytes ("uint8" data type). If dz=0, skip this step.
4. If dx=1: write the entropy-encoded or the byte-packed refinement bits for the x component of the wavelet coefficients as a sequence of bytes ("uint8" data type). If dx=0, skip this step.
5. If dy=1: write the entropy-encoded or the byte-packed refinement bits for the y component of the wavelet coefficients as a sequence of bytes ("uint8" data type). If dy=0, skip this step.
6. If dz=1: write the entropy-encoded or the byte-packed refinement bits for the z component of the wavelet coefficients as a sequence of bytes ("uint8" data type). If dz=0, skip this step.
7. If the displacements of the vertices of the base mesh are provided, then entropy-code these displacements (e.g., using the RLGR coding technique) and write the encoded data to the zerotree bitstream as a sequence of bytes ("uint8" data type). Note that there is no need to send the length of the code for the base mesh displacements to the decoder since this coded data is written at the end of the zerotree bitstream and so the decoder can simply read the bitstream until the end to collect all the coded base mesh displacement data.

In the context of the test model's framework, the above syntax to produce a zerotree bitstream per frame of an input mesh sequence can be generated. The zerotree bitstream 850 can replace the part of the test model's bitstream that is associated with video-coded displacement data embedded 560, adding it to the rest of the bitstream, including the base mesh bitstream 370 and the attribute map bitstream 380. The zerotree bitstream is preceded by a "uint16" (2-byte) value to indicate the size (number of bytes) of the zerotree bitstream that follows, so the decoder can figure out where the zerotree bitstream starts and ends. The decoder parses the received zerotree bitstream to extract the required data for the zerotree decoding, as described above.

Progressive zerotree coding (lossy to (near) lossless). To implement a progressive zerotree coding (i.e., with more than one dominant and one refinement passes), the above syntax for non-progressive zerotree coding can be repeated as many times as the number of dominant (and refinement) passes that are carried out: however, with some of the following differences. First, in the bitstream corresponding to the first dominant and refinement pass, the size (number of bytes) of the coded base mesh displacements (that appear at the end of this bitstream) should be added at the end of the header to indicate to the decoder the location in the bitstream that corresponds to the beginning of the second dominant and refinement passes. Second, for the bitstream corresponding to the second pass onwards, there is no need to send the threshold values since they can be produced, e.g., set to half of the previous threshold (initially sent in the first pass) at each new pass. Third, after the first pass, the data related to refinement bits are sent both if dominant symbols exist in the current pass (i.e., if the dx, dy, and dz flags are equal to one) and if there are significant wavelet coefficients from previous passes (the existence of which is indicated by the flag "exist_prev_ref_bits" below) that need to have further refinement bits transmitted in the current pass. These new refinement bits are related to the threshold of the current pass (as explained above in Step C9).

The progressive zerotree bitstream is organized as follows, starting from the first dominant and refinement pass (the differences from the above non-progressive zerotree bitstream syntax are indicated in bold):

SYNTAX FOR > 1 DOMINANT AND REFINEMENT PASS FOR EACH ZEROTREE:

```
1st pass:
Header:
 dx   dy   dz
[0/1][0/1][0/1]                              (3 bits total)
if dx = 1:        [alph__x                   (3-bit code, from table above)]
if dy = 1:        [alph__y                   (3-bit code, from table above)]
if dz = 1:        [alph__z                   (3-bit code, from table above)]
if dx = 1:        [rlgr__ref__x (1 bit to indicate if RLGR is used (1) or not (0) to code ref. bits)]
if dy = 1:        [rlgr__ref__y (1 bit to indicate if RLGR is used (1) or not (0) to code ref. bits)]
if dz = 1:        [rlgr__ref__z (1 bit to indicate if RLGR is used (1) or not (0) to code ref. bits)]
if dx = 1:                          [length__code__dx     (uint16)][thresh__dx (uint8)]
if dy = 1:                          [length__code__dy     (uint16)][thresh__dy (uint8)]
if dz = 1:                          [length__code__dz     (uint16)][thresh__dz (uint8)]
if dx = 1:                          [length__code__rx     (uint16)]
if dy = 1:                          [length__code__ry     (uint16)]
if dz = 1:                          [length__code__rz     (uint16)]
if base disp. != all 0:             [length__code__base__disp (uint16)]
Encoded data (payload):
if dx = 1:                          [dom__sym__x__coded (uint8)](Arithmetic-coded)
if dy = 1:                          [dom__sym__y__coded (uint8)](Arithmetic-coded)
if dz = 1:                          [dom__sym__z__coded (uint8)](Arithmetic-coded)
if dx = 1:                          [ref__bits__x__coded (uint8)](RLGR-coded/byte-packed
directly)
if dy = 1:                          [ref__bits__y__coded (uint8)](RLGR-coded/byte-packed
directly)
if dz = 1:                          [ref__bits__z__coded (uint8)](RLGR-coded/byte-packed
directly)
if base disp. != all 0:           [base__disp__coded (uint8)](RLGR-coded)
2nd pass:
Header:
 dx   dy   dz
[0/1][0/1][0/1]                                     (3 bits total)
if dx = 1:                             [alph__x     (3-bit code, from table above)]
if dy = 1:                             [alph__y     (3-bit code, from table above)]
if dz = 1:                             [alph__z     (3-bit code, from table above)]
if dx = 1 or exist__prev__ref__bits[x] = 1:   [rlgr__ref__x (1 bit)]
if dy = 1 or exist__prev__ref__bits[y] = 1:   [rlgr__ref__y (1 bit)]
if dz = 1 or exist__prev__ref__bits[z] = 1:   [rlgr__ref__z (1 bit)]
*** The above fit into max. 15 bits (if dx & dy & dz = 1); pad any remaining empty bits with
zeros to get max. 2 bytes ***
if dx = 1:                             [length__code__dx        (uint16)]
if dy = 1:                             [length__code__dy        (uint16)]
if dz = 1:                             [length__code__dz        (uint16)]
if dx = 1 or exist__prev__ref__bits[x] = 1:   [length__code__rx        (uint16)]
if dy = 1 or exist__prev__ref__bits[y] = 1:   [length__code__ry        (uint16)]
if dz = 1 or exist__prev__ref__bits[z] = 1:   [length__code__rz        (uint16)]
Encoded data (payload):
if dx = 1:                          [dom__sym__x__coded (uint8)](Arithmetic-coded)
if dy = 1:                          [dom__sym__y__coded (uint8)](Arithmetic-coded)
if dz = 1:                          [dom__sym__z__coded (uint8)](Arithmetic-coded)
if dx = 1 or exist__prev__ref__bits[x] = 1:
                                    [ref__bits__x__coded (uint8)](RLGR-coded/byte-packed)
if dy = 1 or exist__prev__ref__bits[y] = 1:
                                    [ref__bits__y__coded (uint8)](RLGR-coded/byte-packed)
if dz = 1 or exist__prev__ref__bits[z] = 1:
                                    [ref__bits__z__coded (uint8)](RLGR-coded/byte-packed)
```

3rd pass onwards:
Repeat the same syntax as for the 2nd pass.

The above syntax for progressive zerotree bitstream can be generated for each frame of the input mesh sequence. The progressive zerotree bitstream 850 can replace the part of the test model's bitstream associated with video-coded displacement data 560, adding it to the rest of the bitstream, including the base mesh bitstream 370 and the attribute map bitstream 380.

As mentioned above, the zerotree bitstream is "embedded" bitstream—that is, the bits received for each "pass" can enable a complete reconstruction of the input signal. However, the quality and accuracy of the reconstruction will progressively improve as more bits are received for each subsequent pass and used for reconstruction. Generally, progressive coding means that the decoder can choose to stop the decoding of the bitstream when it is satisfied with the quality of the reconstruction and/or it has reached its bitrate limit. However, in the context of the test model, in order to integrate the zerotree bitstream into the overall bitstream generated by the coding system, the embedded zerotree bitstream should be preceded by its maximum size (even if the decoder chooses not to decode the entire zerotree bitstream), so that the decoder knows where the zerotree bitstream part ends and the bitstream for the next data type begins. In this case, the total number of passes performed by the encoder may either be sent in the overall bitstream or set as a pre-defined parameter known to the encoder and the decoder (and so need not be transmitted to the decoder).

The features of the mesh zerotree coder, as disclosed herein, can be instrumental if adopted by a standard such as the MPEG V-MESH (V-DMC) coding standard. The mesh zerotree coder's features provide flexibility in implementing the standard. For example, different users with different system capabilities and requirements can adapt the standard implementation to their own needs. Additionally, the zerotree coding presented herein is particularly effective in a case where a very simple base mesh (small number of vertices and faces) and a large number of resolution levels (subdivisions) in the wavelet hierarchy are used. This is because the number of edge-based trees in the zerotree hierarchy (that is proportional to the number of the base mesh edges) is lower, and each of these edge-based trees is longer (as the number of mesh subdivisions is higher) leading to wavelet coefficients that are arranged according to a longer hierarchy and thus highly compressible.

The illustrations of the aspects described herein are intended to provide a general understanding of the structure, function, and operation of the various aspects. The illustrations are not intended to serve as a complete description of all of the elements and features of apparatuses and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The description of the aspects is provided to enable the making or use of the aspects. Various modifications to these aspects will be readily apparent, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method for progressively encoding a mesh, comprising:

obtaining displacement data, representative of a spatial difference between a base mesh and the mesh;

transforming the displacement data into wavelet coefficients, computed at multiple resolution levels associated with respective mesh subdivisions representative of the mesh; and zerotree encoding the wavelet coefficients in a traversal order according to a zerotree hierarchy, wherein the zerotree encoding generates, by a zerotree bitstream syntax, a zerotree bitstream of coded displacement data, and wherein a significance flag is turned on, if one or more wavelet coefficients of a respective dimension, of the computed wavelet coefficients, are labeled as positive significant coefficients or as negative significant coefficients during the zerotree encoding.

2. The method according to claim 1, further comprising:

constructing the zerotree hierarchy including constructing edge-based trees, wherein each edge-based tree is associated with an edge of the base mesh and with a respective subset of the wavelet coefficients.

3. The method according to claim 2, wherein each of the edge-based tree is defined by a parent-child edge hierarchy and wherein wavelet coefficients, from the respective wavelet coefficient subset, correspond to respective edges in the parent-child edge hierarchy.

4. The method according to claim 1, wherein the zerotree encoding comprises:

determining, based on the zerotree hierarchy, significance information for the wavelet coefficients.

5. The method according to claim 4, further comprising:

adaptively reconstructing, based on the determined significance information for the wavelet coefficients, the mesh.

6. The method according to claim 5, wherein the determined significance information is for wavelet coefficients associated with splitting a mesh face in one of the mesh subdivisions; and wherein the adaptively reconstructing comprises determining whether to divide the mesh face based on the determined significance information.

7. The method according to claim 1, if the significance flag is turned on, further comprising:

coding, into the zerotree bitstream, a respective state, wherein the respective state is indicative of labels used to label the wavelet coefficients of the respective dimension during the zerotree encoding, the labels are one of a positive significant coefficient, a negative significant coefficient, an isolated zero, and a zerotree root.

8. The method according to claim 1, if the significance flag is turned on, further comprising:

coding, into the zerotree bitstream, significance bits generated by a dominant pass associated with the zerotree encoding of the wavelet coefficients of the respective dimension.

9. The method according to claim 1, if the significance flag is turned on, further comprising:

coding, into the zerotree bitstream, refinement bits generated by a subordinate pass associated with the zerotree encoding of the wavelet coefficients of the respective dimension.

10. A method for progressively decoding a mesh, comprising:

obtaining a zerotree bitstream, coding, by a zerotree bitstream syntax, displacement data representative of a spatial difference between a base mesh and the mesh;

zerotree decoding, from the zerotree bitstream, wavelet coefficients in a traversal order according to a zerotree hierarchy, the wavelet coefficients are computed at multiple resolution levels associated with respective mesh subdivisions representative of the mesh, wherein a significance flag is turned on, if one or more wavelet coefficients of a respective dimension, of the computed wavelet coefficients, are labeled as positive significant coefficients or as negative significant coefficients during the zerotree encoding; and inverse transforming the decoded wavelet coefficients into decoded displacement data.

11. The method according to claim 10, further comprising:

constructing the zerotree hierarchy including constructing edge-based trees, wherein each edge-based tree is associated with an edge of the base mesh and with a respective subset of the wavelet coefficients.

12. The method according to claim 11, wherein each of the edge-based tree is defined by a parent-child edge hierarchy and wherein wavelet coefficients, from the respective wavelet coefficient subset, correspond to respective edges in the parent-child edge hierarchy.

13. The method according to claim 10, wherein the zerotree encoding comprises:

determining, based on the zerotree hierarchy, significance information for the wavelet coefficients.

14. The method according to claim 13, further comprising:

adaptively reconstructing, based on the determined significance information for the wavelet coefficients, the mesh.

15. The method according to claim 14, wherein the determined significance information is for wavelet coefficients associated with splitting a mesh face in one of the mesh subdivisions; and wherein the adaptively reconstructing comprises determining whether to divide the mesh face based on the determined significance information.

16. An apparatus for progressively encoding a mesh, comprising:

at least one processor; and memory storing instructions that, when executed by the at least one processor, cause the apparatus to:

obtain displacement data, representative of a spatial difference between a base mesh and the mesh, transform the displacement data into wavelet coefficients, computed at multiple resolution levels associated with respective mesh subdivisions representative of the mesh, and zerotree encode the wavelet coefficients in a traversal order according to a zerotree hierarchy, wherein the zerotree encoding generates, by a zerotree bitstream syntax, a zerotree bitstream of coded displacement data, and wherein a significance flag is turned on, if one or more wavelet coefficients of a respective dimension, of the computed wavelet coefficients, are labeled as positive significant coefficients or as negative significant coefficients during the zerotree encoding.

17. The apparatus according to claim 16, wherein the instructions further cause the apparatus to:

construct the zerotree hierarchy including constructing edge-based trees, wherein each edge-based tree is associated with an edge of the base mesh and with a respective subset of the wavelet coefficients.

18. The apparatus according to claim 17, wherein each of the edge-based tree is defined by a parent-child edge hierarchy and wherein wavelet coefficients, from the respective wavelet coefficient subset, correspond to respective edges in the parent-child edge hierarchy.

19. The apparatus according to claim 16, wherein the zerotree encoding comprises:

determining, based on the zerotree hierarchy, significance information for the wavelet coefficients; and adaptively reconstructing, based on the determined significance information for the wavelet coefficients, the mesh.

20. An apparatus for progressively decoding a mesh, comprising:

at least one processor; and memory storing instructions that, when executed by the at least one processor, cause the apparatus to:

obtain a zerotree bitstream, coding, by a zerotree bitstream syntax, displacement data representative of a spatial difference between a base mesh and the mesh, zerotree decode, from the zerotree bitstream, wavelet coefficients in a traversal order according to a zerotree hierarchy, the wavelet coefficients are computed at multiple resolution levels associated with respective mesh subdivisions representative of the mesh, wherein a significance flag is turned on, if one or more wavelet coefficients of a respective dimension, of the computed wavelet coefficients, are labeled as positive significant coefficients or as negative significant coefficients during the zerotree encoding, and inverse transform the decoded wavelet coefficients into decoded displacement data.

21. The apparatus according to claim 20, wherein the instructions further cause the apparatus to:

construct the zerotree hierarchy including constructing edge-based trees, wherein each edge-based tree is associated with an edge of the base mesh and with a respective subset of the wavelet coefficients.

22. The apparatus according to claim 21, wherein each of the edge-based tree is defined by a parent-child edge hierarchy and wherein wavelet coefficients, from the respective wavelet coefficient subset, correspond to respective edges in the parent-child edge hierarchy.

23. The apparatus according to claim 20, wherein the zerotree encoding comprises:

determining, based on the zerotree hierarchy, significance information for the wavelet coefficients; and adaptively reconstructing, based on the determined significance information for the wavelet coefficients, the mesh.

24. A non-transitory computer-readable medium comprising instructions executable by at least one processor to perform a method for progressively encoding a mesh, the method comprising:

obtaining displacement data, representative of a spatial difference between a base mesh and the mesh;

transforming the displacement data into wavelet coefficients, computed at multiple resolution levels associated with respective mesh subdivisions representative of the mesh; and zerotree encoding the wavelet coefficients in a traversal order according to a zerotree hierarchy, wherein the zerotree encoding generates, by a zerotree bitstream syntax, a zerotree bitstream of coded displacement data, and wherein a significance flag is turned on, if one or more wavelet coefficients of a respective dimension, of the computed wavelet coefficients, are labeled as positive significant coefficients or as negative significant coefficients during the zerotree encoding.

25. A non-transitory computer-readable medium comprising instructions executable by at least one processor to perform a method for progressively decoding a mesh, the method comprising:

obtaining a zerotree bitstream, coding, by a zerotree bitstream syntax, displacement data representative of a spatial difference between a base mesh and the mesh;

zerotree decoding, from the zerotree bitstream, wavelet coefficients in a traversal order according to a zerotree hierarchy, the wavelet coefficients are computed at multiple resolution levels associated with respective mesh subdivisions representative of the mesh, wherein a significance flag is turned on, if one or more wavelet coefficients of a respective dimension, of the computed wavelet coefficients, are labeled as positive significant coefficients or as negative significant coefficients during the zerotree encoding; and inverse transforming the decoded wavelet coefficients into decoded displacement data.

* * * * *